United States Patent
Kossakovski et al.

(10) Patent No.: US 9,590,282 B2
(45) Date of Patent: Mar. 7, 2017

(54) BATTERY THERMAL MANAGEMENT SYSTEMS INCLUDING HEAT SPREADERS WITH THERMOELECTRIC DEVICES

(71) Applicant: Gentherm Incorporated, Northville, MI (US)

(72) Inventors: Dmitri Kossakovski, S. Pasadena, CA (US); Alfred Piggott, Redford, MI (US); Todd Barnhart, Bloomfield Hills, MI (US)

(73) Assignee: Gentherm Incorporated, Northville, MI (US)

( * ) Notice: Subject to any disclaimer, the term of this patent is extended or adjusted under 35 U.S.C. 154(b) by 0 days.

(21) Appl. No.: 14/437,645

(22) PCT Filed: Oct. 28, 2014

(86) PCT No.: PCT/US2014/062728
§ 371 (c)(1),
(2) Date: Apr. 22, 2015

(87) PCT Pub. No.: WO2015/066079
PCT Pub. Date: May 7, 2015

(65) Prior Publication Data
US 2016/0240903 A1    Aug. 18, 2016

Related U.S. Application Data

(60) Provisional application No. 61/897,121, filed on Oct. 29, 2013.

(51) Int. Cl.
*H01M 10/63* (2014.01)
*H01M 10/6551* (2014.01)
(Continued)

(52) U.S. Cl.
CPC ....... *H01M 10/6572* (2015.04); *H01M 10/63* (2015.04); *H01M 10/6551* (2015.04); *H01M 10/6554* (2015.04); *F25B 21/02* (2013.01)

(58) Field of Classification Search
CPC ............. H01M 10/63; H01M 10/6551; H01M 10/6554; H01M 10/6555; H01M 10/6572
(Continued)

(56) References Cited

U.S. PATENT DOCUMENTS

| | | |
|---|---|---|
| 2,949,014 A | 8/1960 | Belton, Jr. et al. |
| 3,561,224 A | 2/1971 | Hampden et al. |

(Continued)

FOREIGN PATENT DOCUMENTS

| | | |
|---|---|---|
| EP | 1 641 067 | 3/2006 |
| FR | 2 903 057 | 1/2008 |

(Continued)

OTHER PUBLICATIONS

U.S. Appl. No. 14/759,913, filed Jul. 8, 2015, Kossakovski et al.
(Continued)

*Primary Examiner* — Sean P Cullen
(74) *Attorney, Agent, or Firm* — Knobbe, Martens, Olson & Bear, LLP

(57) ABSTRACT

Disclosed embodiments include thermoelectric-based thermal management systems and methods configured to heat and/or cool an electrical device. Thermal management systems can include a heat spreader positioned near a localized heat general of the electrical device. A fin can be connected to the heat spreader with a thermoelectric device positioned on the fin. Electric power can be directed to the thermoelectric device to provide controlled heating and/or cooling to the electrical device.

29 Claims, 12 Drawing Sheets

(51) Int. Cl.
*H01M 10/6554* (2014.01)
*H01M 10/6555* (2014.01)
*H01M 10/6572* (2014.01)
*F25B 21/02* (2006.01)

(58) Field of Classification Search
USPC ........................................................ 429/120
See application file for complete search history.

(56) References Cited

U.S. PATENT DOCUMENTS

| | | | |
|---|---|---|---|
| 4,229,687 A | 10/1980 | Newman | |
| 4,314,008 A | 2/1982 | Blake | |
| 4,324,845 A | 4/1982 | Stockel | |
| 4,444,851 A | 4/1984 | Maru | |
| 4,865,929 A | 9/1989 | Eck | |
| 4,999,576 A | 3/1991 | Levinson | |
| 5,015,545 A | 5/1991 | Brooks | |
| 5,071,652 A | 12/1991 | Jones et al. | |
| 5,121,047 A | 6/1992 | Goedken et al. | |
| 5,141,826 A | 8/1992 | Bohm et al. | |
| 5,197,291 A | 3/1993 | Levinson | |
| 5,229,702 A | 7/1993 | Boehling | |
| 5,269,146 A | 12/1993 | Kerner | |
| 5,395,708 A | 3/1995 | Hall | |
| 5,419,780 A | 5/1995 | Suski | |
| 5,419,980 A | 5/1995 | Okamoto et al. | |
| 5,592,363 A | 1/1997 | Atarashi et al. | |
| 5,623,195 A | 4/1997 | Bullock et al. | |
| 5,650,904 A | 7/1997 | Gilley et al. | |
| 5,705,770 A | 1/1998 | Ogassawara et al. | |
| 5,871,859 A | 2/1999 | Parise | |
| 5,987,890 A | 11/1999 | Chiu et al. | |
| 6,028,263 A | 2/2000 | Kobayashi et al. | |
| 6,050,326 A | 4/2000 | Evans et al. | |
| 6,057,050 A | 5/2000 | Parise | |
| 6,082,445 A | 7/2000 | Dugan | |
| 6,119,463 A | 9/2000 | Bell | |
| 6,138,466 A | 10/2000 | Lake et al. | |
| 6,257,329 B1 | 7/2001 | Balzano | |
| 6,294,721 B1 | 9/2001 | Oravetz et al. | |
| 6,320,280 B1 | 11/2001 | Kanesaka | |
| 6,347,521 B1 | 2/2002 | Kadotani et al. | |
| 6,455,186 B1 | 9/2002 | Moores, Jr. et al. | |
| 6,464,027 B1 | 10/2002 | Dage et al. | |
| 6,570,362 B1 | 5/2003 | Estes et al. | |
| 6,588,217 B2 | 7/2003 | Ghoshal | |
| 6,598,403 B1 | 7/2003 | Ghoshal | |
| 6,645,666 B1 | 11/2003 | Moores, Jr. et al. | |
| 6,653,002 B1 | 11/2003 | Parise | |
| 6,705,089 B2 | 3/2004 | Chu et al. | |
| 6,767,666 B2 | 7/2004 | Nemoto | |
| 6,949,309 B2 | 9/2005 | Moores, Jr. et al. | |
| 6,951,114 B2 | 10/2005 | Grisham et al. | |
| 7,014,945 B2 | 3/2006 | Moores, Jr. et al. | |
| 7,056,616 B2 | 6/2006 | Moores, Jr. et al. | |
| 7,061,208 B2 | 6/2006 | Nishihata et al. | |
| 7,230,404 B2 | 6/2007 | Kimoto et al. | |
| 7,252,904 B2 | 8/2007 | Moores, Jr. et al. | |
| 7,270,910 B2 | 9/2007 | Yahnker et al. | |
| 7,326,490 B2 | 2/2008 | Moores, Jr. et al. | |
| 7,384,704 B2 | 6/2008 | Scott | |
| 7,743,614 B2 | 6/2010 | Goenka et al. | |
| 7,779,639 B2 | 8/2010 | Goenka | |
| 7,863,866 B2 | 1/2011 | Wolf | |
| 7,946,120 B2 | 5/2011 | Bell et al. | |
| 8,163,647 B2 | 4/2012 | Kawabata et al. | |
| 8,701,422 B2 | 4/2014 | Bell et al. | |
| 8,722,222 B2 | 5/2014 | Kossakovski et al. | |
| 8,915,091 B2 | 12/2014 | Goenka | |
| 8,974,942 B2 | 3/2015 | Bell et al. | |
| 2002/0092307 A1 | 7/2002 | Ghoshal | |
| 2003/0217738 A1 | 11/2003 | Ryon | |
| 2005/0029990 A1 | 2/2005 | Tsukamoto et al. | |
| 2005/0133206 A1 | 6/2005 | Scott | |
| 2006/0028182 A1 | 2/2006 | Yang et al. | |
| 2006/0060236 A1 | 3/2006 | Kim | |
| 2006/0093896 A1 | 5/2006 | Hong et al. | |
| 2006/0124165 A1 | 6/2006 | Bierschenk et al. | |
| 2006/0237730 A1 | 10/2006 | Abramov | |
| 2007/0193280 A1 | 8/2007 | Tuskiewicz et al. | |
| 2008/0090137 A1 | 4/2008 | Buck et al. | |
| 2008/0239675 A1 | 10/2008 | Speier | |
| 2008/0311466 A1 | 12/2008 | Yang et al. | |
| 2009/0025770 A1 | 1/2009 | Lofy | |
| 2010/0031987 A1 | 2/2010 | Bell | |
| 2010/0104935 A1 | 4/2010 | Hermann et al. | |
| 2010/0112419 A1 | 5/2010 | Jang et al. | |
| 2010/0128439 A1 | 5/2010 | Tilak et al. | |
| 2010/0243346 A1* | 9/2010 | Anderson | H01M 10/486 180/65.21 |
| 2011/0236731 A1 | 9/2011 | Bell et al. | |
| 2011/0244300 A1 | 10/2011 | Closek et al. | |
| 2011/0287285 A1 | 11/2011 | Yoon | |
| 2012/0285758 A1 | 11/2012 | Bell et al. | |
| 2013/0183566 A1 | 7/2013 | Wayne et al. | |
| 2013/0216887 A1 | 8/2013 | Wayne et al. | |
| 2014/0124176 A1 | 5/2014 | Zhamu et al. | |
| 2014/0331688 A1 | 11/2014 | Kossakovski et al. | |
| 2015/0244042 A1 | 8/2015 | Bell et al. | |
| 2015/0357692 A1 | 12/2015 | Piggott et al. | |
| 2015/0372356 A1 | 12/2015 | Kossakovski et al. | |

FOREIGN PATENT DOCUMENTS

| | | |
|---|---|---|
| JP | 06-207771 | 7/1994 |
| JP | 2003-007356 | 1/2003 |
| JP | 2003-217735 | 7/2003 |
| JP | 2005-057006 | 3/2005 |
| JP | 2008-047371 | 2/2008 |
| JP | 2008-108509 | 5/2008 |
| JP | 2008-218352 | 9/2008 |
| JP | 2008-226617 | 9/2008 |
| JP | 100446339 | 12/2008 |
| JP | 2009-245730 | 10/2009 |
| JP | 2010-108932 | 5/2010 |
| JP | 2010-113861 | 5/2010 |
| KR | 10-2008-0090162 | 10/2008 |
| WO | WO 2008/123663 | 10/2008 |
| WO | WO 2009/053858 | 4/2009 |
| WO | WO 2010/071463 | 6/2010 |
| WO | WO 2010/135371 | 11/2010 |
| WO | WO 2013/009759 | 1/2013 |
| WO | WO 2013/029744 | 3/2013 |
| WO | WO 2014/110524 | 7/2014 |
| WO | WO 2014/120688 | 8/2014 |
| WO | WO 2014/134369 | 9/2014 |
| WO | WO 2015/066079 | 5/2015 |
| WO | WO 2016/040872 | 3/2016 |

OTHER PUBLICATIONS

U.S. Appl. No. 14/760,680, filed Jul. 13, 2015, Piggott et al.
U.S. Appl. No. 14/639,921, filed Mar. 5, 2015, Bell et al.
Behr, "Li-on Battery Cooling", Power Point Presentation, Stuttgart, May 20, 2009, 13 pages.
Behr, "Thermal Management for Hybrid Vehicles", Power Point Presentation, Technical Press Day, May 20, 2009, 20 pages.
Esfahanian, Vahid et al., "Design and Simulation of Air Cooled Battery Thermal Management System Using Thermoelectric for a Hybrid Electric Bus", Proceedings of the FISITA 2012 World Automotive Congress, Nov. 27-30, 2012, vol. 3, Lecture notes in Electrical Engineering, vol. 191, 2013.
Horie, et al., "A Study on an Advanced Lithium-ion Battery System for EVs", The World Electric Vehicle Journal, Oct. 1, 2008, vol. 2, Issue 2, pp. 25-31.
International Search Report and Written Opinion re Application No. PCT/US2010/035321, mailed Dec. 23, 2010.
International Search Report and Written Opinion re Application No. PCT/US2012/046086, mailed Jan. 31, 2013.
International Search Report and Written Opinion re Application No. PCT/US2014/013452, mailed May 8, 2014.

(56) References Cited

OTHER PUBLICATIONS

International Search Report and Written Opinion re Application No. PCT/US2014/011339, mailed Jun. 16, 2014.
International Search Report and Written Opinion re Application No. PCT/US2014/062728, mailed Jan. 20, 2015.
Jeon et al., "Development of Battery Pack Design for High Power Li-Ion Battery Pack of HEV", The World Electric Vehicle Association Journal, 2007, vol. 1, pp. 94-99.
Jeon, et al., "Thermal modeling of cylindrical lithium ion battery during discharge cycle," Energy Conversion and Management, Aug. 2011, vol. 52, Issues 8-9, pp. 2973-2981.
Morawietz, et al., "Thermoelektrische Modellierung eines Lithium-Lonen-Energiespeichers fuer den Fahrzeugeinsatz," VDI-Berichte, Nov. 2008, Issue 2030, pp. 299-318.
Sabbath et al., "Passive Thermal Management System for Plug-in Hybrid and Comparison with Active Cooling: Limitation of Temperature Rise and Uniformity of Termperature Distribution," ECS Transactions, 13(19) 41-52 (Nov. 2008), The Electrochemical Society.

\* cited by examiner

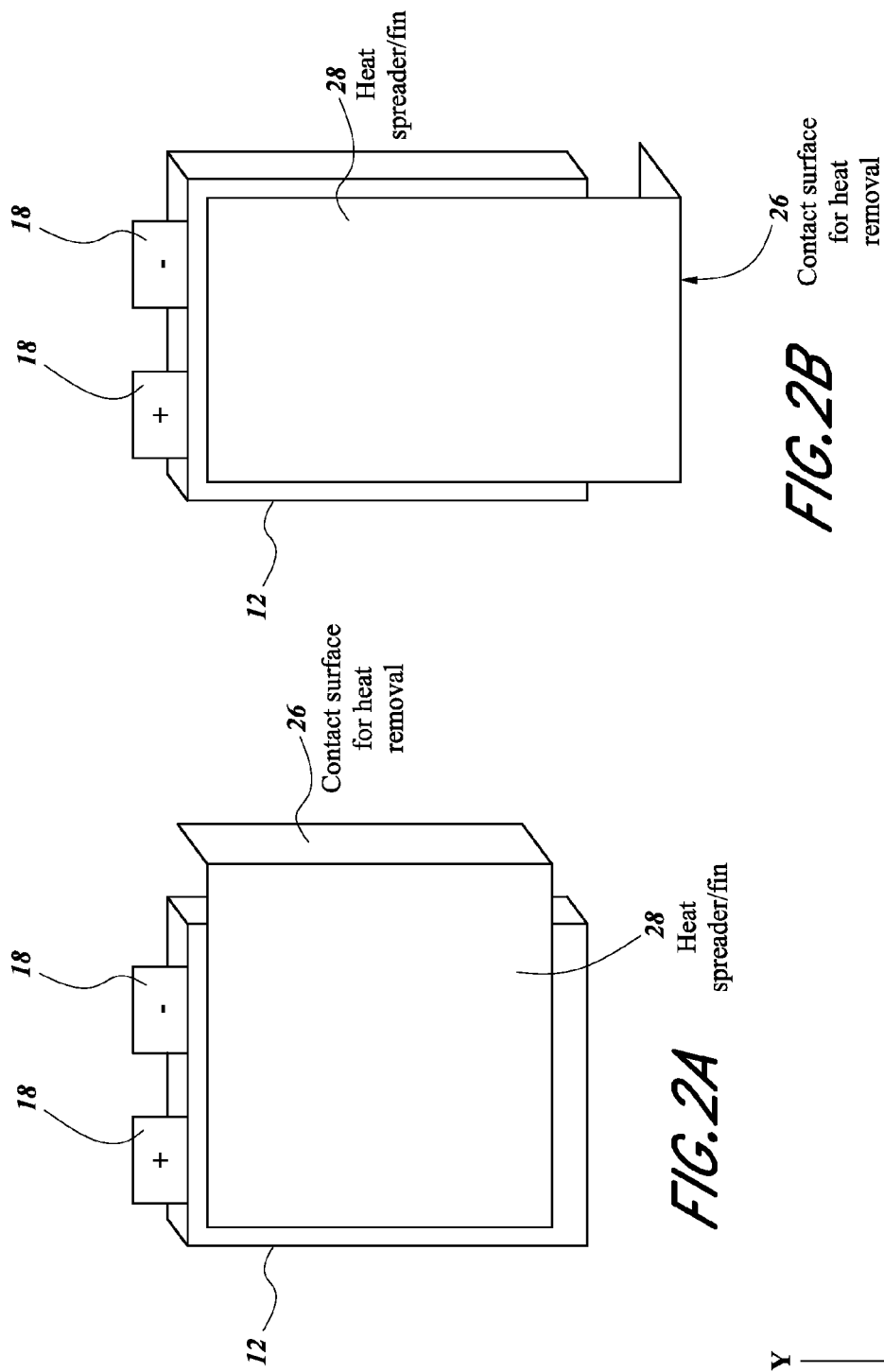

BATTERY THERMAL MANAGEMENT SYSTEMS INCLUDING HEAT SPREADERS WITH THERMOELECTRIC DEVICES

CROSS-REFERENCE TO RELATED APPLICATIONS

This application is the U.S. National Phase under 35 U.S.C. §371 of International Application PCT/US2014/062728, filed Oct. 28, 2014, titled BATTERY THERMAL MANAGEMENT WITH THERMOELECTRICS, which claims the benefit of U.S. Provisional Application No. 61/897,121, filed Oct. 29, 2013, titled BATTERY THERMAL MANAGEMENT WITH THERMOELECTRICS, the entirety of which is incorporated herein by reference.

BACKGROUND

Field

The present application relates generally to thermoelectric (TE) thermal management (e.g., heating and/or cooling) of electrical devices including but not limited to batteries and battery cells.

Description of Related Art

Power electronics and other electrical devices, such as batteries, can be sensitive to overheating, cold temperatures, extreme temperatures, and operating temperature limits. The performance of such devices may be diminished, sometimes severely, when the devices are operated outside of recommended or optimum temperature ranges. In semiconductor devices, integrated circuit dies can overheat and malfunction. In batteries, including, for example, batteries used for automotive applications in electrified vehicles, battery cells and their components can degrade when overheated or overcooled. Such degradation can manifest itself in reduced battery storage capacity and/or reduced ability for the battery to be recharged over multiple duty cycles.

High performance batteries for use in large systems (including, for example, lithium based batteries used in electrical vehicles) have certain properties that make thermal management of the batteries and/or containment system desirable. Charging characteristics of high performance batteries change at elevated temperatures and can cause the cycle life of the batteries to decrease significantly if they are charged at too high of a temperature. For example, the cycle life of some lithium based batteries decreased by over 50% if they are repeatedly charged at about 50° C. Since cycle life can be reduced by a large amount, the lifetime cost of batteries can be greatly increased if charging temperatures are not controlled within proper limits. Also, some high performance batteries can exhibit reduced performance and can be possibly damaged if charged or operated at too low of temperatures, such as below about −30° C. Furthermore, high performance batteries and arrays of high performance batteries can experience thermal events from which the batteries can be permanently damaged or destroyed, and over temperature condition can even result in fires and other safety related events.

SUMMARY

It can be advantageous to manage the thermal conditions of power electronics and other electrical devices. Thermal management can reduce incidences of overheating, overcooling, and electrical device degradation. Certain embodiments described herein provide thermal management of devices that carry significant electric power and/or require high current and efficiency (e.g., power amplifiers, transistors, transformers, power inverters, insulated-gate bipolar transistors (IGBTs), electric motors, high power lasers and light-emitting diodes, batteries, and others). A wide range of solutions can be used to thermally manage such devices, including convective air and liquid cooling, conductive cooling, spray cooling with liquid jets, thermoelectric cooling of boards and chip cases, and other solutions. At least some embodiments disclosed herein provide at least one of the following advantages compared to existing techniques for heating or cooling electrical devices: higher power efficiency, lower or eliminated maintenance costs, greater reliability, longer service life, fewer components, fewer or eliminated moving parts, heating and cooling modes of operation, other advantages, or a combination of advantages.

In some embodiments, a battery cell can be in thermal communication with a thermoelectric device along a shortest thermal path from the hotspot via a heat spreader. A center of the thermoelectric device can be on a line extending along the shortest thermal path.

In some embodiments, the heat spreader can have a fin. The fin can extend substantially parallel to a side of the battery cell.

In some embodiments, the battery cell can be prismatic.

In some embodiments, another thermoelectric device can be connected to the same heat spreader proximate to an opposite side of the battery cell (e.g., the heat spreader has two fins on opposite sides of the battery cell).

In some embodiments, another battery cell can be stacked with the first battery cell. The other battery cell can be in thermal communication with the same heat spreader.

In some embodiments, another heat spreader can be in thermal communication with the other battery cell. Another thermoelectric device can be connected to the other heat spreader.

In some embodiments, a heat plate can be connected to the two heat spreaders with the thermoelectric device on the heat plate.

In some embodiments, the center of the thermoelectric device can be on a line along the shortest thermal paths along one or both of the heat spreaders.

In some embodiments, at least one of the heat spreaders can have a thermal strip.

In some embodiments, the battery cell can have electrodes on a same side with the hotspot closer to the side where the electrodes are connected to the battery cell.

In some embodiments, the battery cell can have electrodes on opposite sides with the hotspot approximately at the center of the battery cell.

In some embodiments, the waste surface of the thermoelectric device can be in thermal communication with air or a wall of an enclosure for the battery cells.

In some embodiments, two battery cells can be in thermal communication with a thermoelectric device via two heat spreaders connected to sides of the battery cells. A third heat spreader can be in thermal with the two heat spreaders. The thermoelectric device can be in thermal communication with the third heat spreader In some embodiments, the center of the thermoelectric device can be on a line along a shortest thermal path of at least one of the battery cells.

In some embodiments, the two battery cells can be stacked, but not necessarily adjacent to each other.

In some embodiments, the heat spreaders can have fins. The fins can extend substantially parallel to a side of a battery cell.

In some embodiments, a third battery cell can be in thermal communication with at least one of the two heat spreaders on the sides of the first two battery cells. The three battery cells can be stacked.

In some embodiments, a fourth heat spreader can be in thermal communication with a side of the third battery cell. The fourth heat spreader can be in thermal communication with the third heat spreader in thermal communication with the thermoelectric device.

Various embodiments of this disclosure relate to a thermoelectric battery thermal management system configured to manage temperature of a battery cell. The thermoelectric battery thermal management system can include the following: a battery cell comprising an electrode configured to deliver electric power to or from the battery cell, the electrode connected to the battery cell on a first side of the battery cell; the battery cell has a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell; a heat spreader on a second side of the battery cell and in thermal communication with the hotspot, the heat spreader over the center of the hotspot on the second side of the battery cell; a thermoelectric device comprising a main surface and a waste surface, the thermoelectric device configured to transfer thermal energy between the main surface and the waste surface of the thermoelectric device upon application of electric current to the thermoelectric device; the main surface of the thermoelectric device is in thermal communication with the heat spreader to heat or cool the battery cell by adjusting a polarity of the electric current delivered to the thermoelectric device; the thermoelectric device is proximate to a third side of the battery cell; and a geometric center of the main surface of the thermoelectric device is substantially on a line along a shortest thermal path on the heat spreader from the center of the hotspot to the third side of the battery cell with the geometric center of the main surface of the thermoelectric device projected onto a plane of the heat spreader extending along the second side of the battery cell.

In some embodiments, the thermoelectric battery thermal management system can include one or more of the following: the second side is substantially perpendicular to a shortest dimension of the battery cell; the battery cell has a prismatic shape; when the prismatic shape is positioned in an X-Y-Z coordinate system, the first side is along an X-Z plane of the X-Y-Z coordinate system, the second side is along an X-Y plane of the X-Y-Z coordinate system, and the third side is along an Y-Z plane of the X-Y-Z coordinate system; a fin connected to the heat spreader and in thermal communication with the hotspot via the heat spreader, the fin proximate to the third side of the battery cell; the fin extends from the heat spreader substantially in parallel with the third side of the battery cell; an other thermoelectric device comprising a main surface and a waste surface, the other thermoelectric device configured to transfer thermal energy between the main surface and the waste surface of the other thermoelectric device upon application of electric current to the other thermoelectric device; the main surface of the thermoelectric device is in thermal communication with the heat spreader to heat or cool the battery cell by adjusting a polarity of the electric current delivered to the other thermoelectric device; the other thermoelectric device is proximate to a fourth side of the battery cell opposite the third side of the battery cell; a geometric center of the main surface of the other thermoelectric device is substantially on the line along the shortest thermal path on the heat spreader with the geometric center of the main surface of the other thermoelectric device projected onto the plane of the heat spreader extending along the second side of the battery cell; an other fin connected to the heat spreader and in thermal communication with the hotspot, the other fin proximate to the fourth side of the battery cell; the other fin extends from the heat spreader substantially in parallel with the fourth side of the battery cell; an other battery cell, the other battery cell comprising an electrode configured to deliver electric power to or from the other battery cell, the electrode connected to other battery cell on a first side of the other battery cell; the other battery cell has an other hotspot corresponding to a temperature increase of the other battery cell when the other battery cell is operating via the electrode delivering electric power to or from the other battery cell, the other hotspot having a center corresponding to a point or a region of the other battery cell having a highest temperature relative to other regions of the other battery cell; the battery cell and the other battery cell are stacked with the first side of the battery cell and the first side of the other battery cell positioned substantially in parallel along a same plane; the other battery cell is in thermal communication with the heat spreader; the other hotspot of the battery cell is heated or cooled by adjusting the polarity of the electric current delivered to the thermoelectric device; an other heat spreader on a second side of the other battery cell and in thermal communication with the other hotspot, the heat other spreader over the center of the other hotspot on the second side of the other battery cell; an other thermoelectric device comprising a main surface and a waste surface, the other thermoelectric device configured to transfer thermal energy between the main surface and the waste surface of the other thermoelectric device upon application of electric current to the other thermoelectric device; the main surface of the other thermoelectric device is in thermal communication with the other heat spreader to heat or cool the battery cell by adjusting a polarity of the electric current delivered to the other thermoelectric device; the other thermoelectric device is proximate to a third side of the other battery cell; a geometric center of the main surface of the other thermoelectric device is substantially on a line along an other shortest thermal path on the other heat spreader from the center of the other hotspot to the third side of the other battery cell with the geometric center of the main surface of the other thermoelectric device projected onto a plane of the other heat spreader extending along the second side of the other battery cell; an other fin connected to the other heat spreader and in thermal communication with the other hotspot via the other heat spreader, the other fin proximate to the third side of the other battery cell; the other fin extends from the other heat spreader substantially in parallel with the third side of the other battery cell; an other heat spreader on a second side of the other battery cell and in thermal communication with the other hotspot, the heat spreader over the center of the other hotspot on the second side of the other battery cell; a heat plate connected to and in thermal communication with both the heat spreader and the other heat spreader proximate to the third side of the battery cell; the main surface of the thermoelectric device is in thermal communication with the heat plate to heat or cool the hotspots of the battery cell and the other battery cell by adjusting the polarity of the electric current delivered to the thermoelectric device; the geometric center of the main surface of the thermoelectric device is substantially on a line along an other shortest thermal path on the other heat spreader from the center of the other hotspot to a third side of the other battery cell with the geometric center of the main surface of the thermoelectric device projected onto a plane of the other heat spreader extending along the second side of the other battery cell, the thermoelectric device proximate to the third side of the other battery cell; when the centers of the hotspot and the other hotspot are projected onto aside of the heat plate, the side of the heat plate parallel to the third sides of the battery cell and the other battery cell, the main surface of the thermoelectric device is over a geometric average center of the centers of the hotspot and the other hotspot projected onto the side of the heat plate; the geometric average center of the centers of the hotspot and the other hotspot is weighted based on the relative temperature of the centers of the hotspot and the other hotspot; an other fin connected to the other heat spreader and in thermal communication with the other hotspot via the other heat spreader, the other fin proximate to the third side of the other battery cell; a strip extending along the shortest thermal path to the thermoelectric device, the strip shorter than the heat spreader in at least one dimension; the strip is connected to the heater spreader and comprising a material having a higher thermal conductivity than a material of the heat spreader; the material of the strip comprises copper, and the material of the heat spreader comprises aluminum; the center of the hotspot is proximate to the first side of the battery cell relative to a fifth side of the battery cell opposite the first side of the battery cell; an entirety of the thermoelectric device is on a same side of a plane extending substantially equidistantly between the first side and the fifth side of the battery cell; the battery cell comprises an other electrode connected to the battery cell on the first side of the battery cell; the center of the hotspot is substantially equidistant between the first side of the battery cell and a fifth side of the battery cell opposite the first side of the battery cell; the battery cell comprises an other electrode connected to the battery cell on the fifth side of the battery cell; the thermoelectric device extends along the third side of the battery cell less than half of a length of the third side along the second side of the battery cell; the thermoelectric device extends along the third side of the battery cell less than one-third of the length of the third side along the second side of the battery cell; a controller in electrical communication with the thermoelectric device and configured to control the polarity of electric current provided to the thermoelectric device; a first polarity of electric current is provided in a cooling mode of system operation; a second polarity opposite the first polarity of electric current is provided in a heating mode of system operation; a temperature sensor in thermal communication with the battery cell and in electrical communication with the controller; the temperature sensor provides temperature information to the controller to adjust the polarity or a magnitude of the electric current delivered to the thermoelectric device; the waste surface of the thermoelectric device is in the thermal communication with a fluid capable of acting as a heat source or a heat sink for the system; the fluid is air; the battery cell is sealed within an enclosure; and/or the waste surface of the thermoelectric device is in thermal communication with a wall of the enclosure, the wall of enclosure capable of acting as a heat source or a heat sink for the system.

Various embodiments of this disclosure relate to a thermoelectric battery thermal management system configured to manage temperature of battery cells. The thermoelectric battery thermal management system can include the following: a first battery cell comprising a first electrode configured to deliver electric power to or from the first battery cell, the first electrode connected to the first battery cell on a first side of the first battery cell; the first battery cell has a first hotspot corresponding to a temperature increase of the first battery cell when the first battery cell is operating via the first electrode delivering electric power to or from the first battery cell, the first hotspot having a center corresponding to a point or a region of the first battery cell having a highest temperature relative to other regions of the first battery cell; a second battery cell comprising a first electrode configured to deliver electric power to or from the second battery cell, the first electrode connected to the second battery cell on a first side of the second battery cell; the second battery cell has a second hotspot corresponding to a temperature increase of the second battery cell when the second battery cell is operating via the first electrode delivering electric power to or from the second battery cell, the second hotspot having a center corresponding to a point or a region of the second battery cell having a highest temperature relative to other regions of the second battery cell; a first heat spreader on a second side of the first battery cell and in thermal communication with the first hotspot, the first heat spreader over the center of the first hotspot on the second side of the first battery cell; a second heat spreader on a second side of the second battery cell and in thermal communication with the second hotspot, the second heat spreader over the center of the second hotspot on the second side of the second battery cell; the second sides of the first and second battery cells are substantially parallel to each other; a third heat spreader in thermal communication with the first and second heat spreaders; a thermoelectric device comprising a main surface and a waste surface, the thermoelectric device configured to transfer thermal energy between the main surface and the waste surface of the thermoelectric device upon application of electric current to the thermoelectric device; the main surface of the thermoelectric device is in thermal communication with the third heat spreader to heat or cool the first and second battery cells by adjusting a polarity of the electric current delivered to the thermoelectric device; the thermoelectric device is proximate to a third side of the first battery cell; and a geometric center of the main surface of the thermoelectric device is substantially on a line along a shortest thermal path on the first heat spreader from the center of the first hotspot to the third side of the first battery cell with the geometric center of the main surface of the thermoelectric device projected onto a plane of the first heat spreader extending along the second side of the first battery cell.

In some embodiments, the thermoelectric battery thermal management system can include one or more of the following: the thermoelectric device is proximate to a third side of the second battery cell; the geometric center of the main surface of the thermoelectric device is substantially on a line along a shortest thermal path on the second heat spreader from the center of the second hotspot to the third side of the second battery cell with the geometric center of the main surface of the thermoelectric device projected onto a plane of the second heat spreader extending along the second side of the second battery cell; a first fin connected to the first heat spreader and in thermal communication with the first hotspot via the first heat spreader, the first fin proximate to the third side of the first battery cell; a second fin connected to the second heat spreader and in thermal communication with the second hotspot via the second heat spreader, the second fin proximate to the third side of the first battery cell; the first and second fins are in thermal communication with the third heat spreader to at least in part provide thermal communication between the third heat spreader and the first and second heat spreaders; the first fin extends from the first heat spreader substantially in parallel with the third side of the first battery cell, and the second fin extends from the second heat spreader substantially in parallel with the third side of the second battery cell; a third battery cell comprising a first electrode configured to deliver electric power to or from the third battery cell, the first electrode connected to the third battery cell on a first side of the third battery cell; the third battery cell has a third hotspot corresponding to a temperature increase of the third battery cell when the third battery cell is operating via the first electrode delivering electric power to or from the third battery cell, the third hotspot having a center corresponding to a point or a region of the third battery cell having a highest temperature relative to other regions of the third battery cell; at least one of the first heat spreader or the second heat spreader is on a second side of the third battery cell and in thermal communication with the third hotspot, the first or second heat spreader over the center of the third hotspot on the second side of the third battery cell; the second sides of the first, second, and third battery cells are substantially parallel to each other; the thermoelectric device is configured to heat or cool the third battery cell by adjusting the polarity of the electric current delivered to the thermoelectric device, the thermoelectric device proximate to a third side of the third battery cell; a fourth heat spreader on a fourth side of the third battery cell and in thermal communication with the third hotspot, the fourth side of the third battery cell opposite the second side of the third battery cell, the fourth heat spreader over the center of the third hotspot on the fourth side of the third battery cell; the third heat spreader is in thermal communication with the fourth heat spreader; the geometric center of the main surface of the thermoelectric device is substantially on a line along the shortest thermal path on the fourth heat spreader with the geometric center of the main surface of the thermoelectric device projected onto a plane of the fourth heat spreader extending along the fourth side of the third battery cell; a third fin connected to the fourth heat spreader and in thermal communication with the third hotspot via the fourth heat spreader, the third fin proximate to the third side of the third battery cell; the third fin is in thermal communication with the third heat spreader to at least in part provide thermal communication between the third heat spreader and the fourth heat spreader; the third fin extends from the third heat spreader substantially in parallel with the third side of the third battery cell; a strip extending along at least one shortest thermal path of the first or second heat spreader to the thermoelectric device, the strip shorter than at least one of the first or second spreader in at least one dimension, the strip comprising a material having a higher thermal conductivity than a material of the at least one of the first or second heat spreader; the material of the strip comprises copper, and the material of the first and second heat spreaders comprise aluminum; the center of each hotspot is proximate to the first side of each battery cell relative to a fifth side of each battery cell opposite the first side of each battery cell; an entirety of the thermoelectric device is on a same side of a plane extending substantially equidistantly between the first side and the fifth side of each battery cell; each battery cell comprises a second electrode connected to each battery cell on the first side of each battery cell; the center of each hotspot is substantially equidistant between the first side of each battery cell and a fifth side of each battery cell opposite the first side of each battery cell; each battery cell comprises a second electrode connected to each battery cell on the fifth side of each battery cell; the thermoelectric device extends along the third side of at least one of the first or second battery cell less than half of a length of the third side along the second side of at least one of the first or second battery cell; the thermoelectric device extends along the third side of the at least one of the first or second battery cell less than one-third of the length of the third side along the second side of the at least one of the first or second battery cell; the second side of each battery cell is substantially perpendicular to a shortest dimension of each battery cell; each battery cell has a prismatic shape; when the prismatic shape of each battery cell is positioned in an X-Y-Z coordinate system, the first side of each battery cell is along an X-Z plane of the X-Y-Z coordinate system, the second side of each battery cell is along an X-Y plane of the X-Y-Z coordinate system, and the third side of each battery cell is along an Y-Z plane of the X-Y-Z coordinate system; a controller in electrical communication with the thermoelectric device and configured to control the polarity of electric current provided to the thermoelectric device; a first polarity of electric current is provided in a cooling mode of system operation; a second polarity opposite the first polarity of electric current is provided in a heating mode of system operation; a temperature sensor in thermal communication with at least one battery cell and in electrical communication with the controller; the temperature sensor provides temperature information to the controller to adjust the polarity or a magnitude of the electric current delivered to the thermoelectric device; the waste surface of the thermoelectric device is in thermal communication with a fluid capable of acting as a heat source or a heat sink for the system; the fluid is air; each battery cell is sealed within an enclosure; and/or the waste surface of the thermoelectric device is in thermal communication with a wall of the enclosure, the wall of enclosure capable of acting as a heat source or a heat sink for the system.

Various embodiments of this disclosure relate to a thermoelectric battery thermal management system configured to manage temperature of a battery cell. The thermoelectric battery thermal management system can include the following: a battery cell comprising an electrode configured to deliver electric power to or from the battery cell, the electrode connected to the battery cell on a first surface of the battery cell; the battery cell has a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell; a heat spreader positioned on a second surface of the battery cell and in thermal communication with the hotspot, the heat spreader positioned over the center of the hotspot on the second surface of the battery cell; a fin connected to the heat spreader and in thermal communication with the hotspot via the heat spreader, the fin positioned to provide a shortest thermal path along the heat spreader from the center of the hotspot to the fin, the fin on a first side of a plane, the plane parallel or tangential to the first surface where the electrode connects to the battery cell; the electrode is on a second side of the plane; a thermoelectric device comprising a main surface and a waste surface, the thermoelectric device configured to transfer thermal energy between the main surface and the waste surface of the thermoelectric device upon application of electric current to the thermoelectric device; the main surface of the thermoelectric device is in thermal communication with the fin to heat or cool the battery cell by adjusting a polarity of the electric current delivered to the thermoelectric device; and the shortest thermal path on the heat spreader extends to a dimension of a perimeter of the main surface of the thermoelectric device when the dimension of the perimeter of the main surface of the thermoelectric device is projected onto a surface of the heat spreader where the fin connects to the heat spreader.

In some embodiments, the thermoelectric battery thermal management system can include one or more of the following: the second surface is substantially perpendicular to a shortest dimension of the battery cell; the fin extends from the heat spreader substantially in parallel with a third side of the battery cell; a geometric center of the main surface of the thermoelectric device is positioned substantially along the shortest thermal path on the heat spreader when the geometric center of the main surface of the thermoelectric device is projected onto the surface of the heat spreader where the fin connects to the heat spreader; the battery cell has a prismatic shape; when the prismatic shape is positioned in an X-Y-Z coordinate system, the first surface extends along an X-Z plane of the X-Y-Z coordinate system, the second side extends along an X-Y plane of the X-Y-Z coordinate system, and the third side extends along an Y-Z plane of the X-Y-Z coordinate system; an other fin connected to the heat spreader and in thermal communication with the hotspot, the other fin on the first side of the plane; an other thermoelectric device comprising a main surface and a waste surface, the other thermoelectric device configured to transfer thermal energy between the main surface and the waste surface of the other thermoelectric device upon application of electric current to the other thermoelectric device; the main surface of the other thermoelectric device is in thermal communication with the other fin along a line extending from and parallel to the shortest thermal path along the heat spreader to heat or cool the battery cell by adjusting a polarity of the electric current delivered to the other thermoelectric device; the other fin extends from the heat spreader substantially in parallel with a third side of the battery cell, the third side opposite a fourth side of the battery cell along which the fin extends in parallel; a strip extending along the shortest thermal path to the thermoelectric device, the strip shorter than the heat spreader in at least one dimension, the strip connected to the heater spreader and comprising a material having a higher thermal conductivity than a material of the heat spreader; the material of the strip comprises copper, and the material of the heat spreader comprises aluminum; an other battery cell, the other battery cell comprising an electrode configured to deliver electric power to or from the other battery cell, the electrode connected to other battery cell on a first surface of the other battery cell; the other battery cell has an other hotspot corresponding to a temperature increase of the other battery cell when the other battery cell is operating via the electrode delivering electric power to or from the other battery cell, the other hotspot having a center corresponding to a point or a region of the other battery cell having a highest temperature relative to other regions of the other battery cell; the battery cell and the other battery cell are stacked with the first surface the battery cell and the first surface of the other battery cell positioned in substantially a same plane; the other battery cell is in thermal communication with the heat spreader; the other hotspot of the battery cell is heated or cooled by adjusting the polarity of the electric current delivered to the thermoelectric device; an other heat spreader positioned on a second side of the other battery cell and in thermal communication with the other hotspot, the other heat spreader positioned over the center of the other hotspot on the second side of the other battery cell; an other fin connected to the other heat spreader and in thermal communication with the other hotspot via the other heat spreader, the other fin positioned to provide a shortest thermal path along the other heat spreader from the center of the other hotspot to the other fin, the other fin on a first side of a another plane, the other plane parallel or tangential to the first surface where the electrode connects to the other battery cell; the electrode of the other battery cell is on a second side of the other plane; an other thermoelectric device comprising a main surface and a waste surface, the other thermoelectric device configured to transfer thermal energy between the main surface and the waste surface of the other thermoelectric device upon application of electric current to the other thermoelectric device; the main surface of the other thermoelectric device is in thermal communication with the other fin along the shortest thermal path of the other heat spreader to heat or cool the battery cell by adjusting a polarity of the electric current delivered to the other thermoelectric device; the other fin extends from the other heat spreader substantially in parallel with a third side of the other battery cell; a geometric center of the main surface of the other thermoelectric device is positioned substantially along the shortest thermal path on the heat spreader when the geometric center of the main surface of the other thermoelectric device is projected onto a surface of the other heat spreader where the other fin connects to the other heat spreader; an other heat spreader positioned on a second side of the other battery cell and in thermal communication with the other hotspot, the other heat spreader positioned over the center of the other hotspot on the second side of the other battery cell; an other fin connected to the other heat spreader and in thermal communication with the other hotspot via the other heat spreader, the other fin positioned to provide a shortest thermal path along the other heat spreader from the center of the other hotspot to the other fin, the other fin on a first side of a another plane, the other plane parallel or tangential to the first surface where the electrode connects to the other battery cell; the electrode of the other battery cell is on a second side of the other plane; a heat plate connected to and in thermal communication with both the fin and the other fin; the main surface of the thermoelectric device is in thermal communication with the heat plate to heat or cool the hotspots of the battery cell and the other battery cell by adjusting the polarity of the electric current delivered to the thermoelectric device; the center of the hotspot and the other hotspot are projected onto a side of the heat plate, the main surface of the thermoelectric device is positioned over a geometric average center of the centers of the hotspot and the other hotspot projected onto the side of the heat plate; the geometric average center of the centers of the hotspot and the other hotspot is weighted based on the relative temperature of the centers of the hotspot and the other hotspot; a controller in electrical communication with the thermoelectric device and configured to control the polarity of electric current provided to the thermoelectric device; a first polarity of electric current is provided in a cooling mode of system operation; a second polarity opposite the first polarity of electric current is provided in a heating mode of system operation; a temperature sensor in thermal communication with the battery cell and in electrical communication with the controller; the temperature sensor provides temperature information to the controller to adjust the polarity or a magnitude of the electric current delivered to the thermoelectric device; the waste surface of the thermoelectric device is in thermal communication with a fluid capable of acting as a heat source or a heat sink for the system; the fluid is air; the battery cell is sealed within an enclosure; the waste surface of the thermoelectric device is in thermal communication with a wall of the enclosure, the wall of enclosure capable of acting as a heat source or a heat sink for the system; the battery cell has a cylindrical shape; the heat spreader circumscribes a perimeter of the battery cell about a central axis of the cylindrical shape, the central axis perpendicular to the plane; and/or the fin extends from the heat spreader perpendicular to the central axis with a longitudinal dimension of the fin being parallel to the central axis.

Various embodiments of this disclosure relate to a method of manufacturing a thermoelectric battery thermal management system configured to manage temperature of a battery cell. The method can include the following: connecting a heat spreader to a battery cell having an electrode configured to deliver electric power to or from the battery cell, the electrode connected to the battery cell on a first surface of the battery cell, wherein the battery cell has a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell, wherein the heat spreader is connected on a second surface of the battery cell to be in thermal communication with the hotspot, the heat spreader positioned over the center of the hotspot on the second surface of the battery cell; connecting a fin to the heat spreader in thermal communication with the hotspot, the fin positioned to provide a shortest thermal path along the heat spreader from the center of the hotspot to the fin, the fin on a first side of a plane, the plane parallel or tangential to the first surface where the electrode connects to the battery cell, wherein the electrode is on a second side of the plane; and connecting a thermoelectric device to the fin, the thermoelectric device comprising a main surface and a waste surface, the thermoelectric device configured to transfer thermal energy between the main surface and the waste surface of the thermoelectric device upon application of electric current to the thermoelectric device, wherein the main surface of the thermoelectric device is in thermal communication with the fin to heat or cool the battery cell by adjusting a polarity of the electric current delivered to the thermoelectric device, wherein a geometric center of the main surface of the thermoelectric device is positioned substantially along the shortest thermal path on the heat spreader when the geometric center of the main surface of the thermoelectric device is projected onto a surface of the heat spreader where the fin connects to the heat spreader.

In some embodiments, the method can include one or more of the following: connecting an other fin to the heat spreader in thermal communication with the hotspot, the other fin on the first side of the plane; connecting an other thermoelectric device to the other fin, the other thermoelectric device comprising a main surface and a waste surface, the other thermoelectric device configured to transfer thermal energy between the main surface and the waste surface of the other thermoelectric device upon application of electric current to the other thermoelectric device, wherein the main surface of the other thermoelectric device is in thermal communication with the other fin along a line extending from and parallel to the shortest thermal path along the heat spreader to heat or cool the battery cell by adjusting a polarity of the electric current delivered to the other thermoelectric device; connecting a strip along the shortest thermal path to the thermoelectric device, the strip shorter than the heat spreader in at least one dimension, the strip connected to the heater spreader and comprising a material having a higher thermal conductivity than a material of the heat spreader; stacking an other battery cell with the battery cell, the other battery cell comprising an electrode configured to deliver electric power to or from the other battery cell, the electrode connected to other battery cell on a first surface of the other battery cell, wherein the other battery cell has an other hotspot corresponding to a temperature increase of the other battery cell when the other battery cell is operating via the electrode delivering electric power to or from the other battery cell, the other hotspot having a center corresponding to a point or a region of the other battery cell having a highest temperature relative to other regions of the other battery cell, and wherein the battery cell and the other battery cell are stacked with the first surface the battery cell and the first surface of the other battery cell positioned in substantially a same plane; connecting an other heat spreader to a second side of the other battery cell and in thermal communication with the other hotspot, the other heat spreader positioned over the center of the other hotspot on the second side of the other battery cell; connecting an other fin to the other heat spreader in thermal communication with the other hotspot via the other heat spreader, the other fin positioned to provide a shortest thermal path along the other heat spreader from the center of the other hotspot to the other fin, the other fin on a first side of a another plane, the other plane parallel or tangential to the first surface where the electrode connects to the other battery cell, wherein the electrode of the other battery cell is on a second side of the other plane; connecting an other thermoelectric device with the other fin, the other thermoelectric device comprising a main surface and a waste surface, the other thermoelectric device configured to transfer thermal energy between the main surface and the waste surface of the other thermoelectric device upon application of electric current to the other thermoelectric device, wherein the main surface of the other thermoelectric device is in thermal communication with the other fin along the shortest thermal path of the other heat spreader to heat or cool the battery cell by adjusting a polarity of the electric current delivered to the other thermoelectric device; connecting an other heat spreader to a second side of the other battery cell and in thermal communication with the other hotspot, the other heat spreader positioned over the center of the other hotspot on the second side of the other battery cell; connecting an other fin to the other heat spreader and in thermal communication with the other hotspot via the other heat spreader, the other fin positioned to provide a shortest thermal path along the other heat spreader from the center of the other hotspot to the other fin, the other fin on a first side of a another plane, the other plane parallel or tangential to the first surface where the electrode connects to the other battery cell, wherein the electrode of the other battery cell is on a second side of the other plane; connecting a heat plate in thermal communication to both the fin and the other fin; connecting the main surface of the thermoelectric device with the heat plate in thermal communication to heat or cool the hotspots of the battery cell and the other battery cell by adjusting the polarity of the electric current delivered to the thermoelectric device; connecting a controller to the thermoelectric battery thermal management system, wherein the controller is configured to control a polarity of electric current provided to the thermoelectric device, wherein a first polarity of electric current is provided in a cooling mode of system operation, and wherein a second polarity opposite the first polarity of electric current is provided in a heating mode of system operation; connecting a temperature sensor in thermal communication with the battery cell and in electrical communication with the controller; connecting the waste surface of the thermoelectric device to a fluid capable of acting as a heat source or a heat sink for the thermoelectric battery thermal management system; and/or sealing the battery cell within an enclosure and connecting the waste surface of the thermoelectric device with a wall of the enclosure, the wall of enclosure capable of acting as a heat source or a heat sink for the system.

Various embodiments of this disclosure relate to a thermoelectric battery thermal management system configured to manage temperature of a battery cell. The thermoelectric battery thermal management system can include the following: a battery cell comprising an electrode configured to deliver electric power to or from the battery cell, the electrode connected to the battery cell on a first side of the battery cell; the battery cell has a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell; a heat spreader positioned on a second side of the battery cell and in thermal communication with the hotspot, the heat spreader positioned over the center of the hotspot on the second side of the battery cell; a fin connected to the heat spreader and in thermal communication with the hotspot via the heat spreader, the fin positioned proximate to a third side of the battery cell, the second and the third sides of the battery cell connected at a common edge that is no farther away from the center of the hotspot than any other edge between sides of the battery cell; a thermoelectric device comprising a main surface and a waste surface, the thermoelectric device configured to transfer thermal energy between the main surface and the waste surface of the thermoelectric device upon application of electric current to the thermoelectric device; the main surface of the thermoelectric device is in thermal communication with the fin to heat or cool the battery cell by adjusting a polarity of the electric current delivered to the thermoelectric device; and a geometric center of the main surface of the thermoelectric device is positioned substantially along a thermal path on the heat spreader when the geometric center of the main surface of the thermoelectric device is projected onto a plane of the heat spreader extending along the second side of the battery cell, the thermal path extending from the center of the hot sport perpendicularly toward the common edge.

Various embodiments of this disclosure relate to a thermoelectric battery thermal management system configured to manage temperature of a battery cell. The thermoelectric battery thermal management system can include the following: a battery cell comprising an electrode configured to deliver electric power to or from the battery cell, the electrode connected to the battery cell on a first surface of the battery cell; the battery cell has a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell; a heat spreader positioned on a second surface of the battery cell and in thermal communication with the hotspot, the heat spreader positioned over the center of the hotspot on the second surface of the battery cell; a fin connected to the heat spreader and in thermal communication with the hotspot via the heat spreader; a thermoelectric device comprising a main surface and a waste surface, the thermoelectric device configured to transfer thermal energy between the main surface and the waste surface of the thermoelectric device upon application of electric current to the thermoelectric device; the main surface of the thermoelectric device is in thermal communication with the fin to heat or cool the battery cell by adjusting a polarity of the electric current delivered to the thermoelectric device; and the hot spot and the thermoelectric device are located on a same side of a plane passing through the battery cell parallel to the first surface and dissecting the battery cell in to two equal portions.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

The summary is provided to introduce a selection of concepts in a simplified form that are further described below in the Detailed Description. This summary is not intended to identify key features or essential features of any subject matter described herein.

BRIEF DESCRIPTION OF THE DRAWINGS

Various embodiments are depicted in the accompanying drawings for illustrative purposes, and should in no way be interpreted as limiting the scope of the thermoelectric assemblies or systems described herein. In addition, various features of different disclosed embodiments can be combined with one another to form additional embodiments, which are part of this disclosure. Any feature or structure can be removed, altered, or omitted. Throughout the drawings, reference numbers may be reused to indicate correspondence between reference elements.

FIGS. 2A-2B illustrate embodiments of battery cells with heat spreaders and fins.

DETAILED DESCRIPTION

Figure 1A:
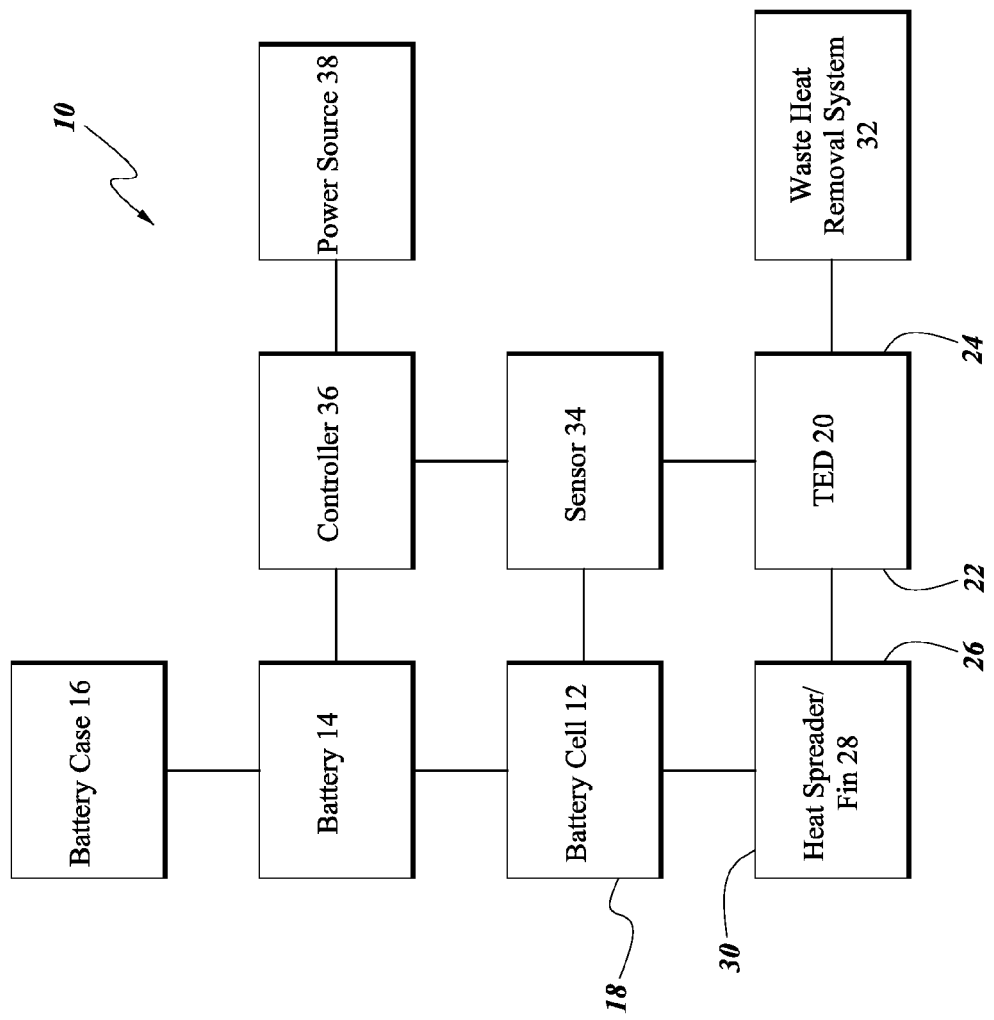
FIG. 1A is a schematic illustration of an embodiment of a battery thermal management system.

Various embodiments are depicted in the accompanying drawings for illustrative purposes, and should in no way be interpreted as limiting the scope of the thermoelectric assemblies or systems described herein. In addition, various features of different disclosed embodiments can be combined with one another to form additional embodiments, which are part of this disclosure. Any feature or structure can be removed, altered, or omitted. Throughout the drawings, reference numbers may be reused to indicate correspondence between reference elements.

Although certain embodiments and examples are disclosed herein, the subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Thermoelectric (TE) systems can be operated in either heating/cooling or power generation modes. In the former, electric current is passed through a TE device to pump the heat from the cold side to the hot side or vice versa. In the latter, a heat flux driven by a temperature gradient across a TE device is converted into electricity. In both modalities, the performance of the TE device is largely determined by the figure of merit of the TE material and by the parasitic (dissipative) losses throughout the system. Working elements in the TE device are typically p-type and n-type semiconducting materials.

A thermoelectric system or device as described herein can be a thermoelectric generator (TEG) which uses the temperature difference between two fluids, two solids (e.g., rods), or a solid and a fluid to produce electrical power via thermoelectric materials. Alternatively, a thermoelectric system or device as described herein can be a heater, cooler, or both which serves as a solid state heat pump used to move heat from one surface to another, thereby creating a temperature difference between the two surfaces via the thermoelectric materials. Each of the surfaces can be in thermal communication with or comprise a solid, a liquid, a gas, or a combination of two or more of a solid, a liquid, and a gas, and the two surfaces can both be in thermal communication with a solid, both be in thermal communication with a liquid, both be in thermal communication with a gas, or one can be in thermal communication with a material selected from a solid, a liquid, and a gas, and the other can be in thermal communication with a material selected from the other two of a solid, a liquid, and a gas.

The thermoelectric system can include a single thermoelectric device (TED) or a group of thermoelectric devices depending on usage, power output, heating/cooling capacity, coefficient of performance (COP) or voltage. Although the examples described herein may be described in connection with a heating/cooling system, the described features can be utilized with either a power generator or a heating/cooling system.

The terms "thermal communication" or "thermally coupled" are used herein in their broad and ordinary sense, describing two or more components that are configured to allow heat transfer from one component to another. For example, such thermal communication can be achieved, without loss of generality, by snug contact between surfaces at an interface; one or more heat transfer materials or devices between surfaces; a connection between solid surfaces using a thermally conductive material system, wherein such a system can include pads, thermal grease, paste, one or more working fluids, or other structures with high thermal conductivity between the surfaces (e.g., heat exchangers); other suitable structures; or combinations of structures. Substantial thermal communication can take place between surfaces that are directly connected (e.g., contact each other) or indirectly connected via one or more interface materials.

As used herein, the terms "shunt" and "heat exchanger" have their broadest reasonable interpretation, including but not limited to a component (e.g., a thermally conductive device or material) that allows heat to flow from one portion of the component to another portion of the component. Shunts can be in thermal communication with one or more thermoelectric materials (e.g., one or more thermoelectric elements) and in thermal communication with one or more heat exchangers of the thermoelectric assembly or system. Shunts described herein can also be electrically conductive and in electrical communication with the one or more thermoelectric materials so as to also allow electrical current to flow from one portion of the shunt to another portion of the shunt (e.g., thereby providing electrical communication between multiple thermoelectric materials or elements). Heat exchangers (e.g., tubes and/or conduits) can be in thermal communication with the one or more shunts, one or more TEDs and/or one or more working fluids of the thermoelectric assembly or system. Various configurations of one or more shunts and one or more heat exchangers can be used (e.g., one or more shunts and one or more heat exchangers can be portions of the same unitary element, one or more shunts can be in electrical communication with one or more heat exchangers, one or more shunts can be electrically isolated from one or more heat exchangers, one or more shunts can be in direct thermal communication with the thermoelectric elements, one or more shunts can be in direct thermal communication with the one or more heat exchangers, an intervening material can be positioned between the one or more shunts and the one or more heat exchangers). Furthermore, as used herein, the words "cold," "hot," "cooler," "hotter," "coldest," "hottest," and the like are relative terms, and do not signify a particular temperature or temperature range. As used herein, the words "short," "long," "shorter," "longer," "shortest," "longest," and the like are relative terms, and do not signify a particular length or length range.

It can be advantageous to manage the thermal conditions of power electronics and other electrical devices. Thermal management can reduce incidences of overheating, overcooling, and electrical device degradation. Certain embodiments described herein provide thermal management of devices that carry significant electric power and/or require high current and efficiency (e.g., power amplifiers, transistors, transformers, power inverters, insulated-gate bipolar transistors (IGBTs), electric motors, high power lasers and light-emitting diodes, batteries, automotive batteries and others). A wide range of solutions can be used to thermally manage such devices, including convective air and liquid cooling, conductive cooling, spray cooling with liquid jets, thermoelectric cooling of boards and chip cases, and other solutions. At least some embodiments disclosed herein provide at least one of the following advantages compared to existing techniques for heating or cooling electrical devices: reduced thermal losses along the thermal path from the heat source to the TED, heating and cooling modes of operation, other advantages, or a combination of advantages.

In electrical devices, typically electrically active portions and/or temperature sensitive regions of the device are connected to the outside world, such as, for example, external circuits or devices, via electrical conductors. For example, electrodes of a battery cell can be designed to carry high electric power without significant losses (e.g., heat losses that are proportional to the square of the current, per Joule's Law). The wire gauge of the electrical conductors used for such electrodes is commensurate with the high current that typically flows in such devices. The larger the size of the battery is, the bigger are the electrode posts for connection with the outside circuits.

Battery thermal management is desired to maintain batteries within an optimum temperature range. This maximizes both performance and useful life of the battery. Although the examples described herein may be described in connection with a heating/cooling system for a battery, the described features can be utilized with other electrical devices as described herein.

In general, for most battery chemistries, as temperatures rise, discharge time (capacity) increases, ability to deliver current increases and charging time decreases. For these metrics, high battery temperatures are generally favorable. However, regarding the metric of battery life, the opposite is generally true. High temperatures reduce useful battery life. It has been found that maintaining batteries within an ideal temperature range or prescribed temperature at the right time can balance battery life with other performance metrics.

Start-stop batteries may be located under the hood of a vehicle. The temperature under the hood of a vehicle is typically above the ideal or prescribed temperature range. To improve the useful life of the battery it is best to maintain the battery at lower temperatures than the under hood environment of a vehicle.

Different thermal management strategies have been devised for batteries, but thermoelectric (TE) thermal management using one or more TEDs can be beneficial over other thermal management strategies for many reasons. One advantage of TE thermal management is it places little or no other (e.g., additional) burden on the vehicle in terms of coolant hoses or refrigerant lines. Another advantage is electric power for the TE thermal management can be delivered by the battery itself making the system "stand-alone" or "in-line."

Embodiments disclosed herein include systems and methods capable of thermally managing an electrical device (e.g., battery) by applying direct or indirect thermoelectric (TE) cooling and/or heating to the electrical devices. Such devices can often benefit from thermal management. Some embodiments will be described with reference to particular electrical devices, such as, for example, batteries, battery casings and battery cells. However, at least some embodiments disclosed herein are capable of providing thermal management to other electrical devices, such as, for example, insulated-gate bipolar transistors (IGBTs), other electrical devices, or a combination of devices. At least some such devices can suffer from operation outside of a preferred temperature range. The operation of some embodiments is described with reference to a cooling mode of operation. However, some or all of the embodiments disclosed herein can have a heating mode of operation, as well. In some situations a heating mode of operation can be employed to maintain the temperature of an electrical device above a threshold temperature, under which the electrical device may degrade or exhibit impaired operation. TE devices are uniquely suited to provide both heating and cooling functions with minimum complications for system architecture.

There are a variety of ways in which TE devices can be used for electrical device cooling and/or heating tasks. As described herein, TE devices can include one or more TE elements, TE assemblies and/or TE modules. In some embodiments, a TE system can include a TE device, which comprises a first side and a second side opposite the first side. In some embodiments, the first side and second side can be a main surface and waste surface, or heating surface and cooling surface (or a main side and waste side, or heating side and cooling side). In certain embodiments, the main surface can control the temperature of a device under thermal management while the waste surface connects is connected to a heat source or heat sink. A TE device can be operably coupled with a power source. The power source can be configured to apply a voltage to the TE device. When voltage is applied in one direction, one side (e.g., first side) creates heat while the other side (e.g., the second side) absorbs heat. Switching polarity of the circuit creates the opposite effect. In a typical arrangement, a TE device comprises a closed circuit that includes dissimilar materials. As a DC voltage is applied to the closed circuit, a temperature difference is produced at the junction of the dissimilar materials. Depending on the direction of the electric current, heat is either emitted or absorbed at a particular junction. In some embodiments, the TE device includes several solid state P- and N-type semi-conductor elements connected in series; or groups (e.g., modules) of P- and N-type semi-conductor elements connected in series, with the groups connected in a parallel and/or series configuration to provide operational robustness to the TE device.

In certain embodiments, the junctions are sandwiched between two electrical isolation members (e.g., ceramic plates), which can form the cold side and the hot side of the TE device. The cold side can be thermally coupled (directly or indirectly) to an object (e.g., electrical conductor, electrical device under thermal management, battery cell, heat spreader/fin, etc.) to be cooled and the hot side can be thermally coupled (directly or indirectly) to a waste heat removal system which dissipates heat to the environment. Any suitable technique can be used including, but not limited to a heat exchanger, heat sink, heat pipe and/or exposure to ambient air. In some embodiments, the hot side can be thermally coupled (directly or indirectly) to an object (e.g., electrical conductor, electrical device under thermal management, battery cell, heat spreader/fin, etc.) to be heated. Certain non-limiting embodiments are described below.

In some embodiments, a heat pipe can be provided as a waste heat removal or transport mechanism. Waste heat from a TE device can be dissipated in a heat sink. Examples of heat sinks include heat exchangers, waste streams, other structures for dissipating heat, and combinations of structures. A heat sink can be attached (directly or indirectly) to the waste side or surface of the TE device. The heat sink can be cooled by air, liquid, or, alternatively, it can be a solid member connecting the TE device with a bigger solid heat sink such as a battery case, car frame, or another structural element that dissipates heat effectively. However, in practical applications, such as, for example, a battery thermal management system, there can be packaging constraints that limit the possibility of bringing the cooling media close to the waste side of the TE device. Alternatively, a heat or thermal transport device may be used to move the heat from the waste side of the TE device to another location where heat dissipation may be implemented effectively.

In some embodiments, a heat transfer device or exchanger can be used to connect the waste side or surface of the TE device to a heat sink where the heat is ultimately dumped by, for example, air, liquid, or solid. Such a heat sink can be for example the liquid cooling circuit of the car, a radiator or an air cooled heat sink, ambient air, working fluid, fluid reservoir, or a solid body (e.g., battery case or car frame).

Battery thermal management systems (BTMS) can be used to control temperatures and monitor conditions of batteries and arrays of batteries to prevent battery failure and/or safety related failure. A BTMS can improve the overall conditions of battery operation by both managing the thermal environment and also being sufficiently reliable so that overall system performance is not degraded.

A variety of embodiments of battery thermal management systems are described below to illustrate various configurations. The particular embodiments and examples are only illustrative and features described in one embodiment or example may be combined with other features described in other embodiments or examples. Accordingly, the particular embodiments and examples are not intended to be restrictive in any way.

In some embodiments, a BTMS includes at least one battery, battery case, battery cell, plate in contact with the cell, electrode and/or battery array. In certain embodiments, a battery thermal management system can be used to both heat and cool batteries, battery cells, and/or battery arrays. For example, the battery thermal management system can be integrated with the at least one battery, the battery thermal management system can be integrated with an enclosure wherein the at least one battery or battery cell is contained, or the thermal management system can be positioned in thermal communication with the at least one battery or battery cell.

As schematically illustrated in the block diagram of FIG. 1A, in certain embodiments, a battery thermal management system (BTMS) 10 includes one or more battery cells 12 of a battery 14. The battery cell(s) 12 include one or more electrodes 18. In some embodiments, the battery cell(s) 12 is enclosed by a battery case 16. The BTMS 10 can further include one or more TEDs 20 having a first side 22 (e.g., for providing heating or cooling to the battery cell(s) 12) and a second side 24 (e.g., waste surface). In some embodiments, the first side 22 is in thermal communication with a portion (e.g., fin 26) of a heat spreader/fin 28. The heat spreader/fin 28 includes a cell contact portion 30 in thermal communication with a portion of the battery cell(s) 12. The fin 26 can extend in the same direction, perpendicular to, or at various other angles relative to the cell contact portion 30. In some embodiments, the second side 24 of the TEDs 20 is coupled or configured to be coupled to a waste heat removal system 32 for dissipation or removal of heat from the TE device 20.

In some embodiments, the battery case 16, second side 24 (e.g., waste surface) of the TEDs 20, waste heat removal system 32 and/or battery cell(s) 12 are exposed to the ambient air such that heat can be dissipated or removed accordingly to the environment. In other embodiments, the battery case 16 is sealed. In some embodiments, the BTMS 10 includes a power source 38 for providing electrical current to the TEDs 20. In other embodiments, the TEDs 20 are powered in-line with the battery 14. In some embodiments, the BTMS 10 includes a controller 36 in electrical communication with the power source 38 and/or battery 14. In some embodiments, the BTMS 10 includes sensors 34 (e.g., electrical, temperature) for providing electrical and/or temperature information of the battery cells 12, TEDs 20, ambient temperature, and/or temperature within the battery case 16 to the controller 36 such that the electrical power (e.g., current, voltage) to the TEDs 20 can be adjusted accordingly to provide the appropriate level of heating or cooling as desired or required to maintain the temperature of the battery at an optimum level.

As discussed herein, one way to thermally manage battery cells is to use one or more thermoelectric TEDs, in some embodiments, one or more TEDs may be used to cool or heat one or more battery cases, battery cells, cold plates, heat spreader, and/or fins in contact with the battery cells, air circulating within, or blown through the battery case, electrodes of the batteries, battery terminals, or other components.

Generally, in order to use TEDs efficiently it is important to reduce the thermal losses (e.g., thermal resistance) along the thermal path from the heat source to the TED. Therefore, the location (e.g., position, alignment) of the one or more TEDs needs to be optimized based on the specifics of the electrical device (e.g., battery cell construction) and localization of heat production.

Figure 1B:
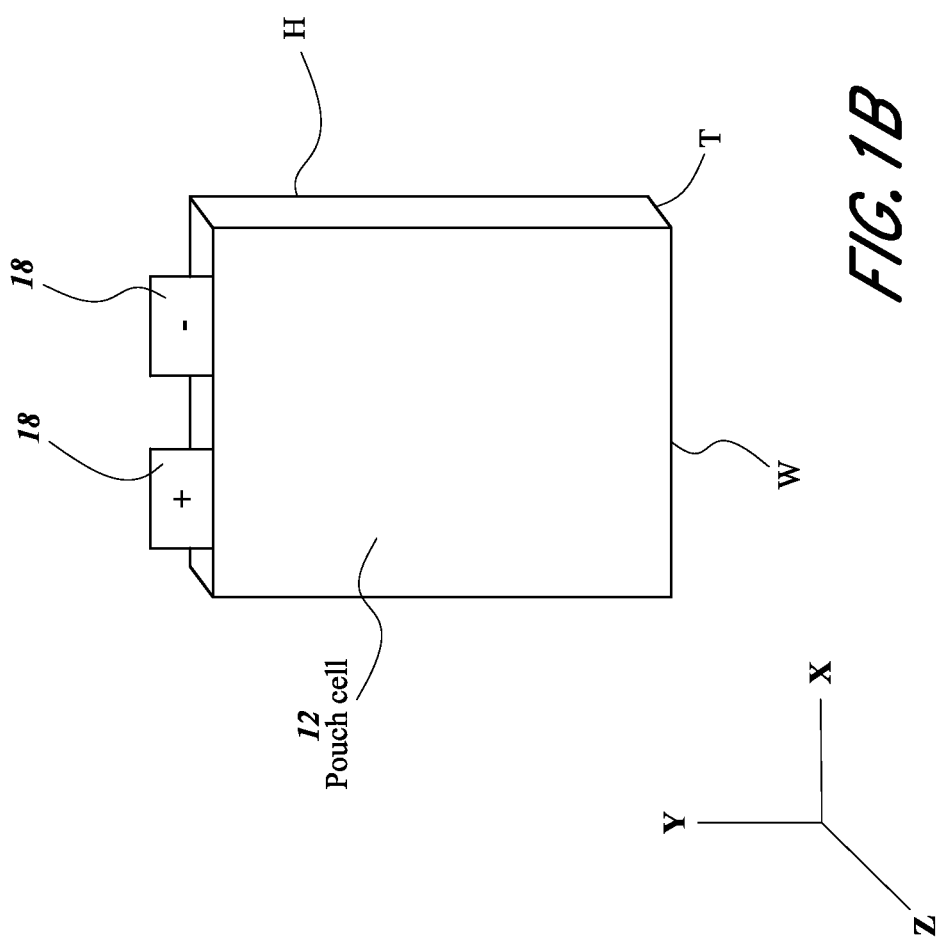
FIG. 1B illustrates an embodiment of a battery cell.

X-Y-Z axes (e.g., a three-dimensional Cartesian coordinate system) are provided for reference in the Figures. The X-Y-Z axes are perpendicular with each other (e.g., pair-wise perpendicular). In some embodiments, a rectangular battery cell is provided as an example (e.g., a pouch cell, prismatic hard can). However, various other shaped battery cells can be used, including but not limited to a square, cylinder, triangle, polygon, etc. FIG. 1B illustrates an example rectangular pouch cell 12 having dimensions of height H along the Y-axis, thickness T along the Z-axis, and width W along the X-axis, wherein H is greater than W. In some embodiments, W is greater or equal to H. As illustrated in FIG. 1B, the electrode(s) 18 are positioned on a top side of the cell 12 along the width W.

FIGS. 2A-2B illustrate a pouch cell 12 (e.g., of a battery cell) comprising attachments (e.g., heat spreader/fin 28, which can be made of Aluminum sheet metal, another thermally conductive material, or a combination of materials) that are configured to transfer thermal energy to or from the cell 12. In some embodiments, the attachments remove heat away from the cell 12 and bring the heat to the heat transfer contact surface (e.g., fin 26). The heat can be then removed by a cold plate that may be cooled by air, liquid, via TED, conductively or otherwise (e.g., convection, conduction, and/or radiation). As illustrated in FIG. 2A, in some embodiments, the heat spreader/fin 28 includes a cell contact portion or surface in thermal communication and/or coupled to a surface of the cell 12 coplanar with the X-Y plane. A heat transfer contact surface (e.g., fin 26) can extend perpendicularly and/or at an angle to the cell contact portion of the heat spreader/fin 28 along the Y-Z plane as illustrated in FIG. 2A or the X-Z plane as illustrated in FIG. 2B.

Figure 3:
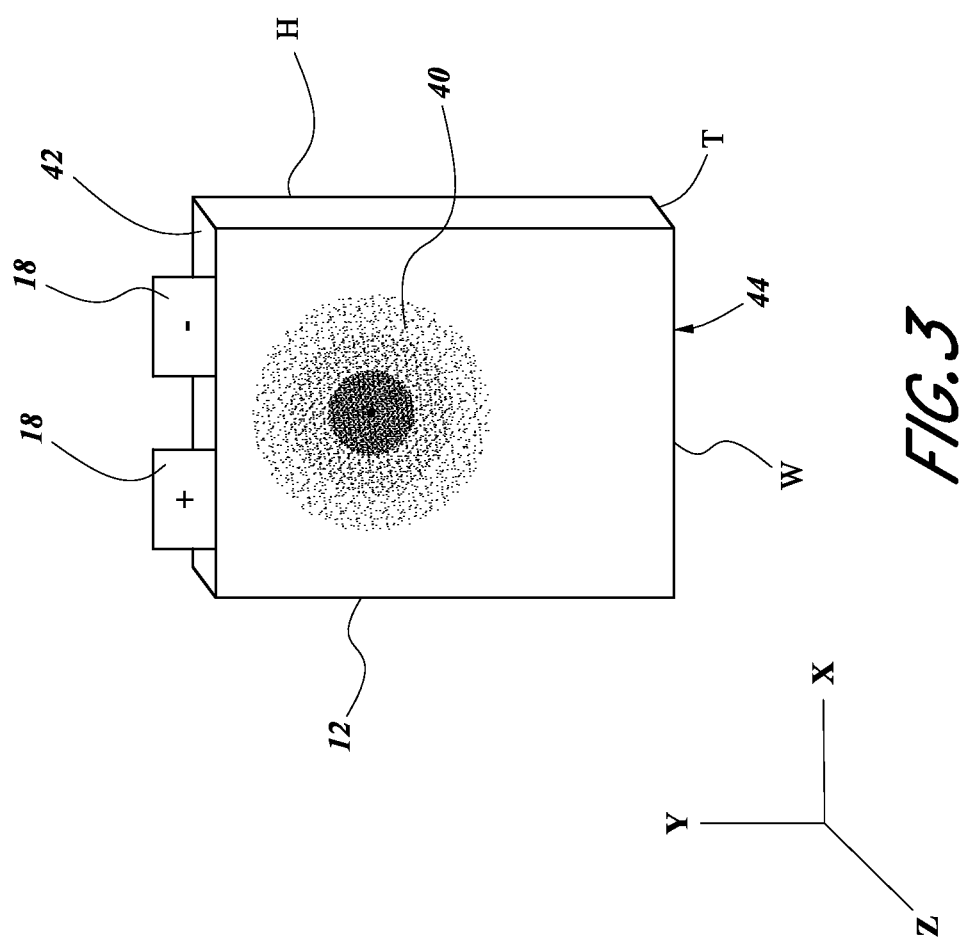
FIG. 3 illustrates an embodiment of battery cell with a hotspot.

Typically, the heat generated by or within a battery cell is not produced uniformly in the cell (e.g., due to the non-uniform current flux in close proximity to the electrodes). In most operating conditions, the heat is produced in a region of the cell that is close (e.g., near or proximate) to the electrodes and between them. Schematically, this hotspot or localized heat generation 40 is illustrated in FIG. 3. Darker shades indicate higher temperature and higher heat generation.

In some embodiments, the localized heat generation 40 does not necessarily have a defined center as discussed herein. Accordingly, a center of localized heat generation may correspond to a spatial/geometric average of the heat generation of the cell 12 projected onto a plane as discussed herein, corresponding a region or point in the cell 12 where the cell 12 experiences the highest temperature fluctuation or range during operation. In some embodiments, the average may be weighted where for example, a relatively hotter heat zone may move the average center of the hotspot closer to the relatively hotter heat zone over other localized heat generation zones. As illustrated in FIG. 3, the heat associated with the hotspot 40 is generated between the electrodes 18, closer or more proximate to a first side 42 of the cell 12 that the electrodes 18 are positioned on, and less heat is generated closer to the opposite side (e.g., second side 44) of the cell 12. The first side 42 and the second side 44 are spaced apart by a distance H (e.g., height of the cell 12) along the Y axis.

The location of the hotspot 40 in the cell 12 and/or sides of the cell 12 may vary during operation and/or life of the cell 12. The hotspot 40 can be considered a point or region of substantially maximum or highest relative temperature of the cell 12 or the vicinity (e.g., environment of the cell 12). The location of the hotspot 40 in the cell 12 may shift or change depending on or as a function of battery charge state, age of the battery, and/or other operational parameters such as for example, the hotspot 40 may shift as the cell 12 heats up (e.g., overall or average temperature of the cell 12 increases) during operation over a period of time. Accordingly, the location of the hotspot 40 and/or center of the hotspot 40 may be a range of locations based on the parameters discussed herein. The hotspot 40 can be located within the location range or at a specific point for positioning the TED 20 as discussed herein. For example, the location of the hotspot 40 can be determined to be where the hotspot 40 originates when the cell 12 is not yet cycled multiple times (e.g., fresh); the location of the hotspot 40 can be determined to be where hotspot is located 40 after the cell 12 has been cycled many times (e.g., aged); the location of the hotspot 40 can be determined to be where the hotspot 40 is located after the cell 12 has been in operation for a predetermined period of time in either charging or discharging mode; and/or the location of the hotspot 40 can be determined to be a location range based on, for example, a combination of any one of the preceding design parameters.

In some embodiments, the TED 20 may be positioned along any one of the centers of the hotspot 40 discussed herein (e.g., based on predetermined operation parameters of the cell 12). In some embodiments, the TED 20 can be positioned at a center of the location range of the hotspot 40 discussed herein. The center of the location range may be weighted, where for example most cooling is desired, such as when for example the cell 12 runs relatively hottest (e.g., during prolonged operation over a predetermined period of time during charging or discharging). Accordingly, the TED 20 can be positioned along a line on the shortest thermal path 31 extending from predetermined location of the center of the hotspot 40. The positioning of the TED 20 can vary and be considered to be positioned on the line when placed within less than 20, 15, 10, 5, or 1 percent from the line in terms of an overall dimension of the side of the cell 12 adjacent to the TED 20 (e.g., less than 20, 15, 10, 5, or 1 percent of the length of height H of the cell 12 away from the line on the shortest thermal path 31 along height H).

As described herein, in some embodiments, the heat removal can be accomplished using one or more TEDs 20. A TED is a localized device, well suited for addressing thermal management of hotspots or localized heat generation in a variety of applications. Because of the inhomogeneous, and well defined, spatial character of heat generation in a battery cell, it is important to position the one or more TEDs 20 in a most favorable location relative to the hotspot or localized heat generation 40 in order to derive the maximum benefit and energy efficiency of the thermal management by the TEDs 20. Therefore, in some embodiments, it is preferable to attach the TEDs to the fins 26 of the heat spreaders 28 in a location that has minimal distance between the TED and hotspot or localized heat generation 40 to reduce the thermal losses (e.g., thermal resistance) along the thermal path from the localized heat generation 40 to the TEDs 20.

Figure 4:
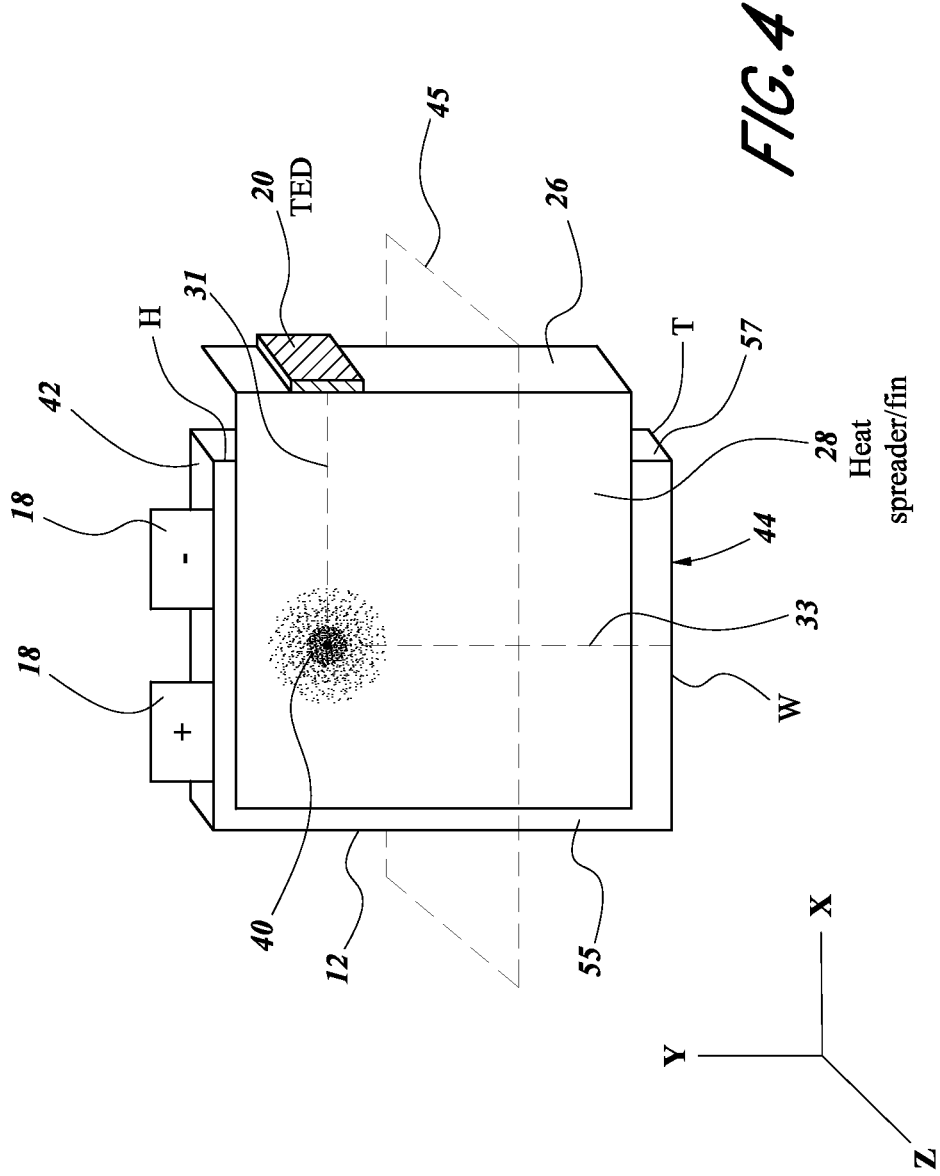
FIG. 4 illustrates an embodiment of a battery cell with a heat spreader over a hotspot.

Such an arrangement of some embodiments is illustrated schematically in FIG. 4. A TED 20 is in thermal communication with the fin 26, and the position of the TED 20 is shifted towards the electrodes 18 of the cell 12 in order to minimize the thermal path from the hotspot 40 to TED 20. The TED 20 is positioned along the length of the cell (e.g., height H along the Y-axis) proximate to or aligned with the hotspot 40. The shortest thermal path for the embodiment illustrated in FIG. 4 is the thermal path or line along the thermal path 31 with the fin 26 positioned according to the constraints or design parameters discussed herein. A longer thermal path 33 may be utilized for embodiments where the fin 26 is located as illustrated in FIG. 2B. A line may extend along the thermal path 33 and continue on, for example, a heat spreader to a fin as discussed herein. Accordingly, the thermal path 31 is shorter than the thermal path 33 based on the dimensions of the cell 12 illustrated in FIG. 4.

The concept of shortest thermal path can be applied to the dimensions and/or features of the cell 12. For example, the shortest thermal path 31 extends along a third side 55 of the cell 12 toward a fourth side 57 of the cell 12. Accordingly, a common edge between the third side 55 and the fourth side 57 is the closest to the hotspot 40 (when the TED 20 is not positioned near or along the first side 42 to not interfere with or obstruct the electrodes 18 as discussed herein). Stated differently, the common edge between the third side 55 and the fourth side 57 is no further than any other edge between the sides of the cell 12 (excluding, for example, the edges adjacent or connected to the first side 42). The closest edge between the third side 55 and the fourth side 57 is along height H illustrated in FIG. 4.

Figure 5:
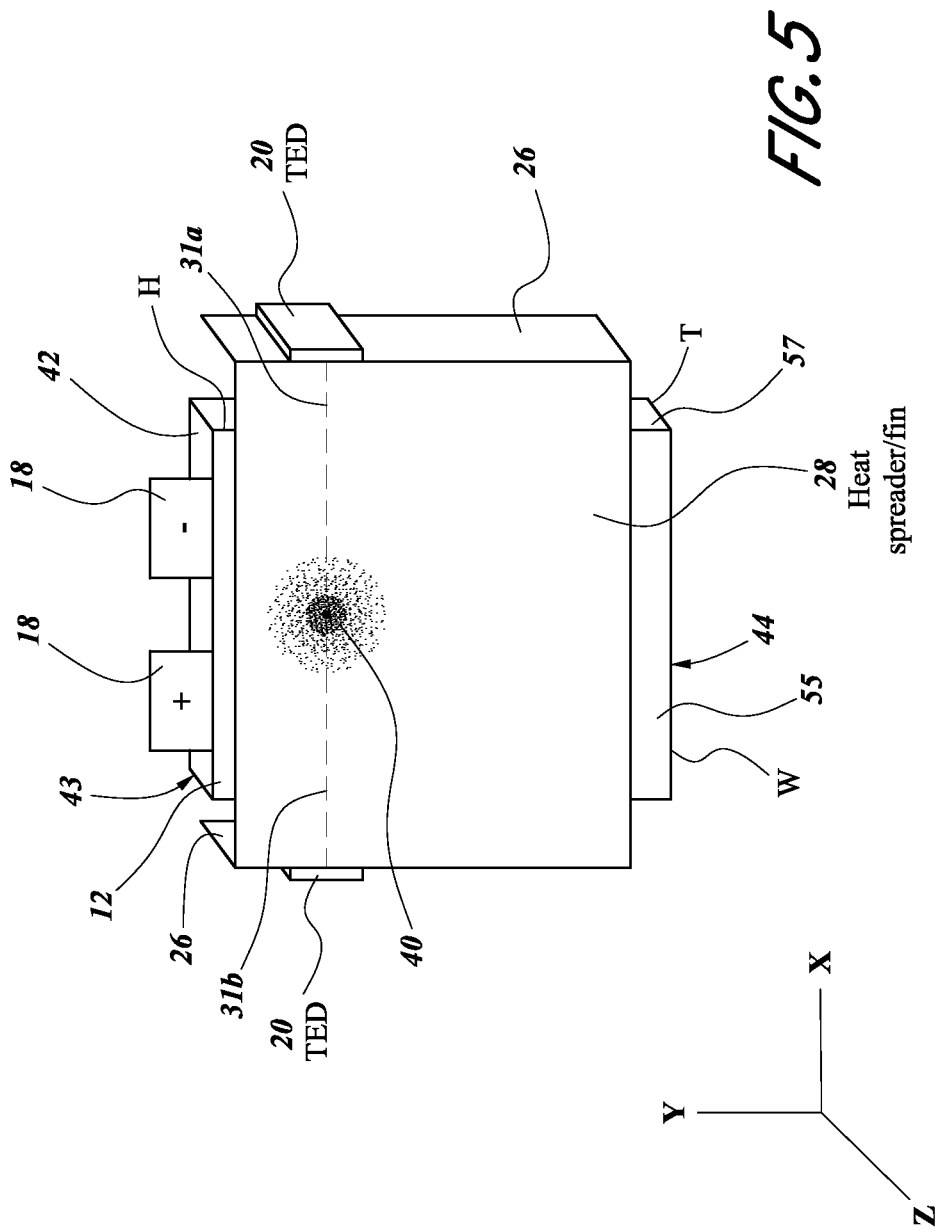
FIG. 5 illustrates an embodiment of a battery cell with two fins connected to a heat spreader over a hotspot.

In some embodiments, the dimensions of cell 12 may be where height H and width W are substantially equal in length. Then the thermal path 31 and thermal path 33 may have substantially the same length. In such embodiments, the "shortest" thermal path can be considered to be either one or both of the thermal paths 31, 33 to provide substantially a same thermal management performance upon meeting other design parameters for placement of the fin(s) 26 as discussed herein. Accordingly, "shortest" thermal path can include a thermal path that is no longer (e.g., not farther away from center of the hotspot 40) than any other thermal path. Thus, in some embodiments, there may more than one shortest thermal path where multiple thermal paths of similar lengths are present. For example, when height H and width W are substantially equal in length, two or more common edges between two sides of the cell 12 may be no further than any other edge of the cell 12. In such embodiments, the TED 20 can be positioned near or proximate to any two of the common edges that are not further than any other edges. For example, as illustrated in FIG. 5, there can be two shortest thermal paths 31*a*, 31*b* on opposite sides of the cell 12 based on the dimensions of the cell 12 and connection positions of the electrodes 18.

In some embodiments, the TED 20 can be positioned directly on the spreader 28 without a fin 26 to be closer to the hotspot 40 along the line on the thermal path 31. For example, an edge or side of the TED 20 may be near, abutting, or in contact (or in the same plane) with the fourth side 57 when positioned on the heat spreader 28. In such embodiments, the fin 26 can also be considered to be connected to the heat spreader 28 along the same plane as the heat spreader 28. For example, the fin 26 can be considered to extend from the heat spreader 28 and continue along the same plane as an extension of the heat spreader 28 (e.g., without extending at an angle relative to the heat spreader 28 as illustrated to be extending at a 90 degree angle from the heat spreader 28 (or parallel to the fourth side 57) in FIG. 4).

In some embodiments, the BTMS 10 is configured to provide heating and/or cooling to a battery 14 having one or more cells 12 with a height H along the Y-axis greater than or equal to 150 millimeters (e.g., ~6 inches). The TED 20 is positioned such that a side, edge, and/or center of the surface (e.g., main surface or first side 22) of the TED 20 is less than or equal to 75 millimeters (e.g., ~3 inches) from the center of the hotspot or localized heat generated 40 along the Y-axis. Other ranges include less than or equal to less than 100, 50, 40, 30, 20, or 10 mm, including the foregoing values and ranges bordering therein, depending on the relative dimensions of the cell 12 being heated or cooled. In some embodiments, the TED 20 is positioned such that the distance between a side, edge, and/or center of the surface (e.g., main surface or first side 22) of the TED 20 from the center of the hotspot to the localized heat generation 40 along the Y-axis is less than 35% of the height H of the cell 12.

In some embodiments, the center of the hotspot 40 and the center of the TED 20 are aligned. For example, the TED 20 can be positioned such that the length of a line extending between the center of the hotspot 40 and the center of the TED 20 is substantially minimized when the TED 20 is positioned at a location along the major length of the fin 26. The position of the TED 20 can be selected to maintain good thermal contact between the main surface of the TED 20 and the fin 26 and to accommodate other design goals of the battery, such as, for example, a cell 12 stack design. In certain embodiments, the fin 26 is located on the side of the cell 12 that provides the shortest distance between the center of the hotspot 40 and the center of the TED 20.

In certain embodiments, the exact location of the hotspot 40 is difficult to predict. In such embodiments, a method to determine an optimum position of the TED 20 can include considering the type of cell under thermal management and/or considering the conditions under which the cell will be used. For example, the position of the TED 20 can be determined at least in part by a drive cycle. In some embodiments, the hotspot 40 is located in the top one-third of the cell (e.g., within one-third of the cell length from the higher electrical resistance electrode) under most charging and discharging conditions.

In some embodiments, the hotspot 40 may be asymmetrically located relative to positive and negative electrodes/tabs. For example, the positive electrode may be constructed from aluminum or another material that has a higher electrical resistance compared to the negative electrode, which may be constructed from copper. In such configurations, more heat is dissipated closer to the higher electrical resistance electrode (e.g., the positive electrode). As a result, the hotspot 40 can be shifted closer to the positive electrode. In some embodiments, packaging design allows a choice of which side of the cell to place the TED 20 on. In such embodiments, the TED 20 can be located closer to the higher electrical resistance electrode.

The BTMS 10 can include a heat spreader 28 positioned along a side that provides the shortest distance or minimizes the thermal path between a center of the hotspot 40 within the cell 12 to the particular side on which the heat spreader 28 is positioned. As illustrated in FIGS. 4 and 5, heat spreader 28 is positioned on the side of the cell 12 contained in the X-Y plane. The X-Y plane is perpendicular the thickness dimension T (e.g., along the Z-axis). As discussed herein, the thickness dimension T in the illustrated embodiments is the shortest dimension of the cell 12. Other dimensions of the cell 12 may be shorter in a chosen coordinate system or orientation of the cell 12.

Placing the heat spreader 28 along the side of the cell 12 (e.g., third side 55) contained in the X-Y plane positions a thermal conductor (e.g., the heat spreader 28) within the shortest thermal path to the hotspot 40 with the given or predetermined dimensions of the cell 12 (e.g., shortest dimension thickness T is in the Z-axis perpendicular to the X-Y plane). Accordingly, when the cells 12 are stacked in tight engagement in a battery case 16 as discussed herein, the heat spreader(s) 28 are pressed against the X-Y plane sides of the cells 12 in tight engagement for structural integrity as well as to provide desired (e.g., good) thermal communication.

With continued reference to FIG. 4, the fin 26 can be directly connected to heat spreader 28 for desired (e.g., good) thermal communication as discussed herein. The fin 26, can be positioned, such as in the Y-Z plane as illustrated in FIG. 2A or the X-Z plane as illustrated in FIG. 2B, to (1) not interfere or physically obstruct the electrode(s) 18 and/or (2) not interfere or physically obstruct stacking of the cells 12 as discussed herein, such as for example, on sides of the cell 12 in the X-Y plane. A third (3) constraint or design parameter can include not interfering with enclosing the cells 12 in, for example, a battery case 16 (e.g., the fin 26 is positioned to not obstruct or protrude beyond a wall of the battery case 16). Meeting design parameter (3) may require positioning the fin 26 as illustrated in FIG. 2B, which in some embodiments, may not provide as a shortest distance or thermal path as the position of the fin 26 in FIG. 2A, but may be necessitated by the space available in the battery case 16 and/or placement of the cells 12 in some other space constrained environment.

The BTMS 10 can include positioning the fin 26 near, at, or along a side of the cell 12 providing a shortest distance or thermal path between the center of the hotspot 40 mapped or projected onto the heat spreader 28 as illustrated in FIG. 4 to an edge or side of the fin 26 (or edge or side of the heat spreader 28 to which the fin 26 is connected). The TED 20 can be positioned on the fin 26 such that a line forming the shortest distance or thermal path to the fin 26 passes through a center (or an edge as discussed herein) of the TED 20 in the X-Y plane. Stated differently, when the fin 26 is positioned according to the design parameters (1) and (2) (as well possibly (3)) to be in the Y-Z plane according to the embodiment illustrated in FIG. 4, the TED 20 can be positioned on the fin 26 such that an X-Z plane intersects both the center (or an edge) of the TED 20 and the center of the hotspot 40. State yet differently again, when the fin 26 is positioned according to the design parameter (1) and (2) (as well possibly (3)) to be in the Y-Z plane according to the embodiment illustrated in FIG. 4, the TED 20 can be positioned on the fin 26 such that a center of the hotspot 40 projected onto the Y-Z plane falls onto a line that is parallel to or along the Z-axis and intersects the center (or an edge) of the TED 20.

With continued reference to FIG. 4, the placement of the TED 20 can be optimized with the following design considerations. A bisecting plane 45 can be positioned to bissect, cut, or split a cell 12 through a midpoint or midline of the cell 12 to form equal halves of the cell 12. The plane 45 is oriented to not intersect a center of the hotspot 40 that is off shifted toward the first side 42 as discussed herein. Accordingly, the plane 45 is oriented to not pass through the side (e.g., first side 42) on which the electrodes 18 are positioned or to not pass between the two electrodes 18. In the embodiment illustrated in FIG. 4, the plane 45 bisects or passes through at a midpoint or half point of the height H. The plane 45 as illustrated bisects a fourth side 57 to have substantially equal sized area surfaces of the third surface on opposite sides of the plane 45. The plane 45 is perpendicular to height H and the fourth side 57. The fourth side 57 can be a surface of the cell 12 substantially along which or parallel to which the fin 26 extends in the Y-Z plane.

As illustrated in FIG. 4, the electrodes 18, hot TED 20, and hotspot 40 are all located on a same side of the plane 45. The plane 45 illustrates the positioning of the various components of the BTMS 10 according to the concepts of this disclosure: the hotspot 40 may be located closer to a side (e.g., first side 42) where the electrodes 18 are located, and accordingly, the TED 20 with supporting structures (e.g., fin 26 and/or heat spreader 28) are positioned closer to that side of the cell 12. The location of the hotspot 40, TED 20, and supporting structures is on a same side of the plane 45 due to the localized heat generation 40 phenomena as discussed herein as illustrated in FIG. 4.

To further improve the efficiency of heat removal, a second TED 20 may be attached on the other side of the cell 12, as illustrated in FIG. 5. In this case the heat spreader 28 has two fins 26 that wrap around the cell 12 (e.g., extending perpendicularly along the Y-Z plane). As illustrated in FIG. 5, the cell 12 has two shortest thermal paths or lines along the thermal paths 31a, 31b along which TED's 20 can be positioned as discussed herein when the hotspot 40 is in a center or midpoint of the third side 55 along width W based on, for example, the positions of the electrodes 18 (e.g., positioned on the first side 42 equidistantly from the fourth side 57 and the fifth side 43). Stated differently, the two lines along thermal paths 31a, 31b are along thermal paths 31a, 31b that are no longer or farther away from the center of the hot spot 40 than any other thermal path along the side of the cell 12 to which the heat spreader 28 is attached (e.g., along the third side 55 as illustrated in FIG. 5). In some embodiments, the height H may be substantially the same or equal to width W. Accordingly, a third shortest thermal path may be provided along the third side 55 leading to the second side 44 of the cell 12. Accordingly, the cell 12 can have, for example, three shortest thermal paths along the third side 55 when height H and width W are equal with the electrodes equidistant from sides 43, 57.

In some embodiments, at least one TED 20 is attached is attached to each fin 26. As illustrated in FIG. 5, the second fin 26 can extend substantially along or parallel to a fifth side 43 of the cell 12 in the Y-Z plane. The common edge between the third side 53 and the fifth side 43 can be another common edge that is no further than any other edge (along with the common edge between the third surface 53 and the fourth side 57), providing another shortest thermal path for positioning the TED 20. The positioning of the fins 26 and/or TED's 20 can follow the same positioning parameters as discussed herein and in particular, in reference to FIGS. 2A, 2B, and 4.

Figure 6:
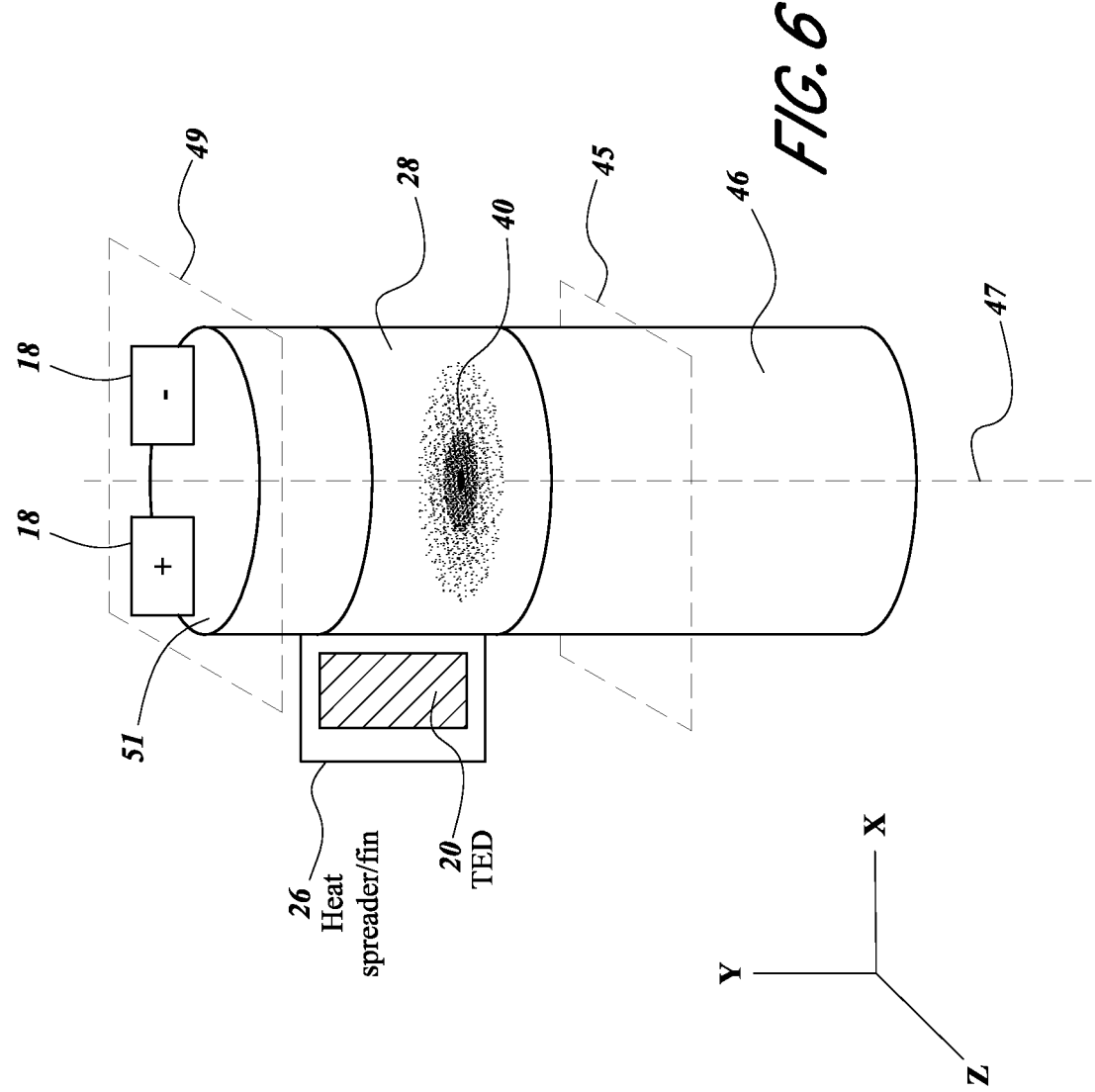
FIG. 6 illustrates an embodiment of a cylindrical battery cell.

The suggested approach may be extended to cell designs beyond pouch or prismatic cells that have electrodes on one side. For example, a heat spreader 28 and fin 26 with TED 20 in thermal communication with a cylindrical cell 46, as illustrated in FIG. 6. As illustrated, in some embodiments, the heat spreader 28 wraps around substantially the entire circumference of the cell 46, and a TED 20 is attached to the fin 26.

For the embodiment illustrated in FIG. 6, consideration for placement of the TED 20, the fin 26, and/or heat spreader 28 can be similar to the other embodiments discussed herein. In addition, a TED 20 is generally manufactured in a flat configuration. Accordingly, a flat fin 26 may be desired to provide a flat surface for thermal communication with the TED 20, rather than, for example, placing a curved TED on the body of the cell 46. The fin 26 can be positioned to provide a shortest distance or thermal path from the center of the hotspot 40 along a plane perpendicular to a central axis 47 of the cell 46 (e.g., axis extending along a longitudinal or longest dimension of the cell 46, such as height in the Y-axis). The TED 20 can be positioned on the fin 26 such that the center (or edge) of the TED 20 and the center of the hotspot 40 are both on the plane perpendicular to the central axis 47 (e.g., in the X-Z plane).

With continued reference to FIG. 6, the fin 26 can be connected to the heat spreader 28 to be fully positioned off to a first side of a plane 49. As illustrated in FIG. 6, the plane 49 is parallel to the surface or side 51 where the electrodes 18 connect to the cell 46. In some embodiments, the plane 49 can be tangential to the surface 51 where the electrodes 18 connect to the cell 46 (e.g., when the surface is curved or non-planar). As illustrated in FIG. 6, the plane 49 can be perpendicular to the central axis 47 and be parallel or along to the X-Z plane. Accordingly, the electrodes 18 are fully positioned off to a second side of the plane 49, the second side opposite the first side of the plane 49. The fins 26 of other embodiments discussed herein (e.g., prismatic cells) can be positioned similarly relative to a plane that extends along or is tangential to a surface of the cell 12 (e.g., side 51 as discussed herein) where the electrodes 18 connect to the cell 12 with the electrodes 18 and the fin 26 positioned on opposite sides of the plane.

As illustrated in FIG. 6, a plane 45 as discussed herein, and in particular in reference to FIG. 4, can be applied to an embodiment of a cylindrical cell 46. The hotspot 40, TED 20, and supporting structures can be located all one side of the bisecting plane 45. The plane 45 split the cylindrical cell 46 in half. The plane 45 can be perpendicular to the central axis 47 or height of the cell 46 along the Y-axis.

The heat spreader 28 can be positioned about a circumference (e.g., along the perimeter or periphery) of the cell 46 to substantially envelope or surround the hotspot 40 about the central axis 47 along the periphery of the cell 46. The heat spreader can extend to any desired length along the central axis 47, including to substantially enclose the periphery of the cell 46 about the central axis 47. In some embodiments, the heat spreader 28 can be the copper strip 50 as discussed herein, and in particular, in reference to FIG. 8.

Figure 7:
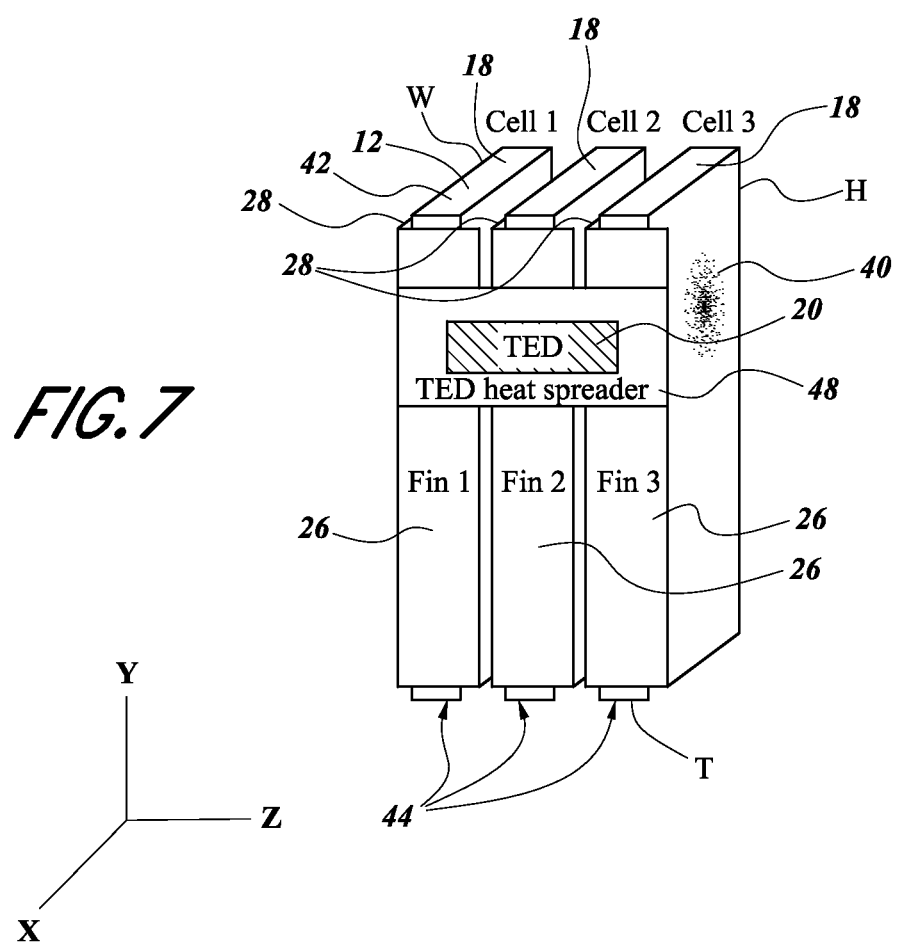
FIG. 7 illustrates an embodiment of battery cells connected to common thermoelectric device.

Another embodiment comprises multiple cells 12 configured to be thermally managed by one TED 20 as illustrated in FIG. 7. As illustrated in the embodiment shown in FIG. 7, a single or common TED 20 is configured to thermally manage three cells 12. The number of cells 12 is chosen for illustration only. Consideration for placement of the TED 20, the fins 26, and/or heat spreaders 28 can be similar to the other embodiments discussed herein.

The fins 26 of the thermal spreaders 28 extending from each of the multiple cells 12 are in thermal communication with a single heat spreader or plate 48 which is in thermal communication with a single TED 20. The location of the TED 20 is optimized to minimize the length of the thermal path between the TED 20 and the hotspot or localized heat generation 40 of the cells 12. In other embodiments, a TED 20 is in thermal communication with less than all the cells 12 (e.g., every other or alternate cell 12).

In some embodiments, the heat spreader 48 can be positioned on the fins 26 to be centered or encompassing the centers of the hotspot 40 projected onto the Y-Z plane (e.g., side of the heat spreader 48 facing or connected to the fins 26). The TED 20 can be positioned on the heat spreader 48 such that a spatial/geometric average of the centers of the hotspots 40 projected onto the Y-Z plane falls onto a line that is parallel or along to the Z-axis and intersects the center (or edge) of the TED 20. The average of the centers of the hotspots 40 projected onto the Y-Z plane can be weighted. For example, a cell 12 that is known or designed to operate at a hotter temperature than the other cells 12 would be weighted more heavily in determining the spatial/geometric average projected onto the Y-Z plane. The heat spreader 48 can be positioned similarly in the Y-Z plane, based on an (optionally weighted) spatial/geometric average of the centers of the hotspots 40 projected onto the Y-Z plane. Accordingly, the position of the TED 20 and/or heat spreader 48 can be adjusted in the Y-axis as well as in the Z-axis depending on the spatial/geometric average of the centers of the hotspots 40 projected onto the Y-Z plane.

Figure 8:
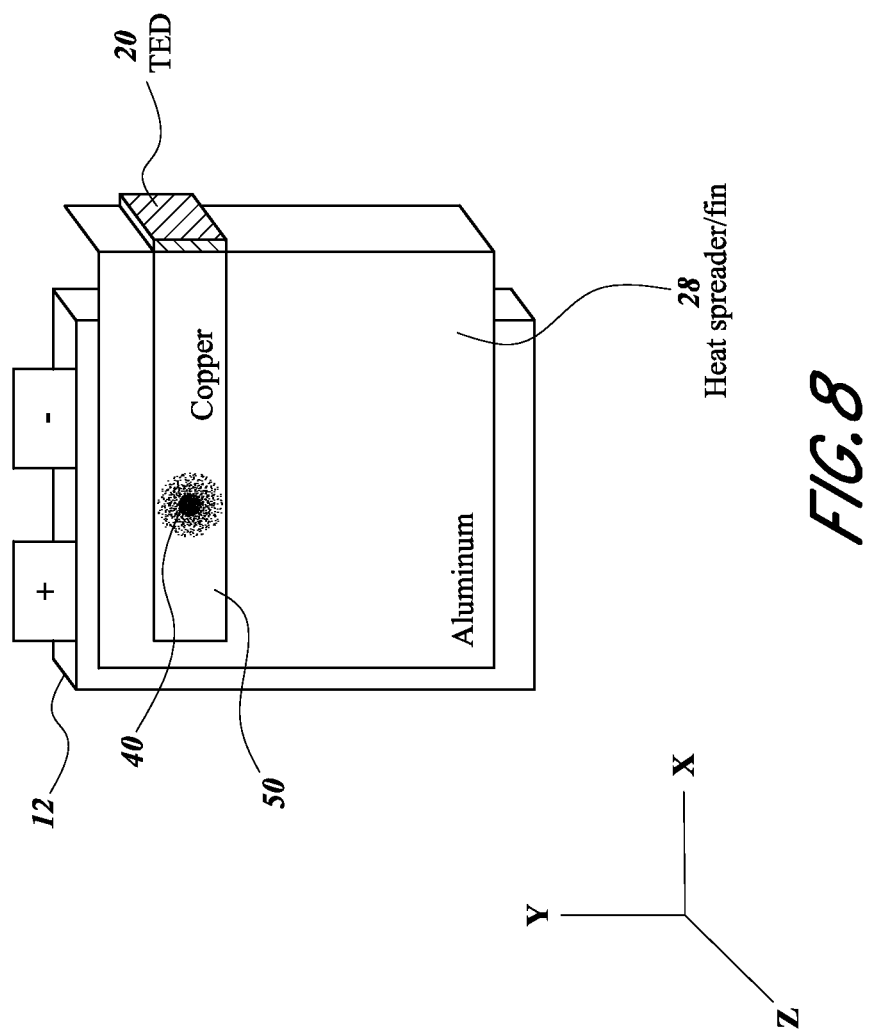
FIG. 8 illustrates an embodiment of a battery cell with a strip positioned over a heat spreader.

Another way to reduce thermal losses along the thermal path between the hotspot or localized heat generation 40 and TED 20 is to incorporate a material with increased thermal conductivity into the heat spreader/fin 28 to facilitate heat transfer to the TED 20. For example, FIG. 8 shows a Copper strip 50 (a material with higher thermal conductivity) incorporated into an Aluminum heat spreader 28 to facilitate heat transfer from the hotspot 40 to the TED 20. Making the whole heat spreader 28 from Copper could be prohibitive due to the cost and/or weight. However, a narrow strip of Copper 50 combined with the Aluminum heat spreader 28 may be more acceptable relatively from the economic point of view, and a superior configuration from a performance point of view. In some embodiments, the Copper strip 50 can be the heat spreader 28 positioned over the hotspot 40 as discussed herein, without an additional, for example, aluminum heat spreader/plate. Similarly, the fin 26 can be a copper strip that is shorter (e.g., in height H or in the Y-axis) relative to, for example, an aluminum fin 26. Such an example embodiment with relatively shorter heat spreader 28 and fin 26 is illustrated in FIG. 6 for the cylindrical cell 46.

Figure 9:
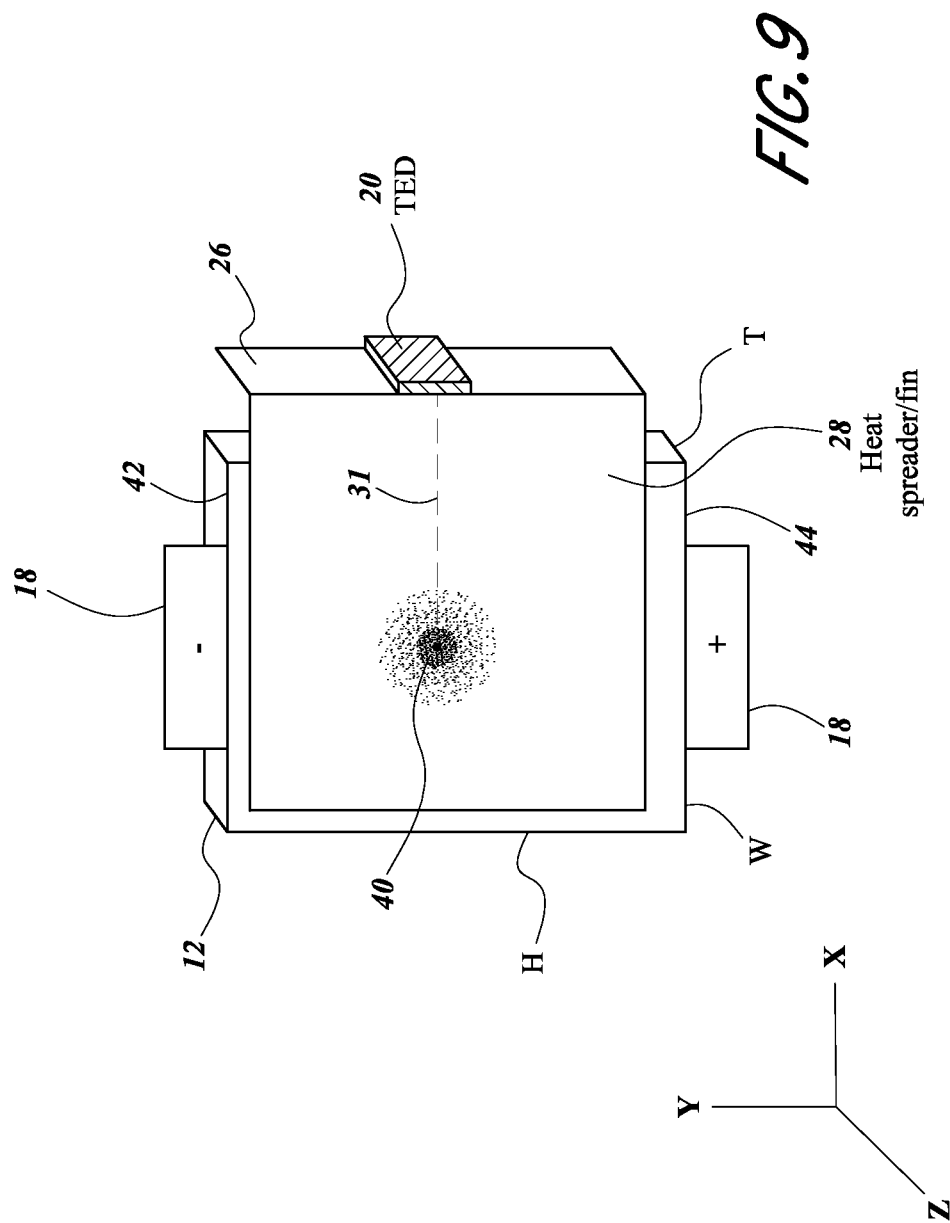
FIG. 9 illustrates an embodiment of a battery cell with electrodes on opposite sides.

In some embodiments, another packaging option is specific to cells that have positive and negative electrodes 18 on opposite sides of the cell 12 (e.g., first side 42 and second side 44 spaced apart by height H). This is illustrated in FIG. 9. In this case the hotspot or localized heat generation 40 of the cell 12 is located more centrally in the cell 12, or specifically in a center or midpoint of the along height H. In order to minimize the thermal path or line along the thermal path 31 from the hotspot or localized heat generation 40 to the cell 12, the position of the TED 20 is adjusted to be located on the fin 26 along a center line bisecting the height H of the cell 12 (e.g., along the X-axis) between the two electrodes 18. In the embodiment illustrated in FIG. 9, the center line bisecting the height H of the cell 12 is substantially along the line of the thermal path 31.

Figure 10:
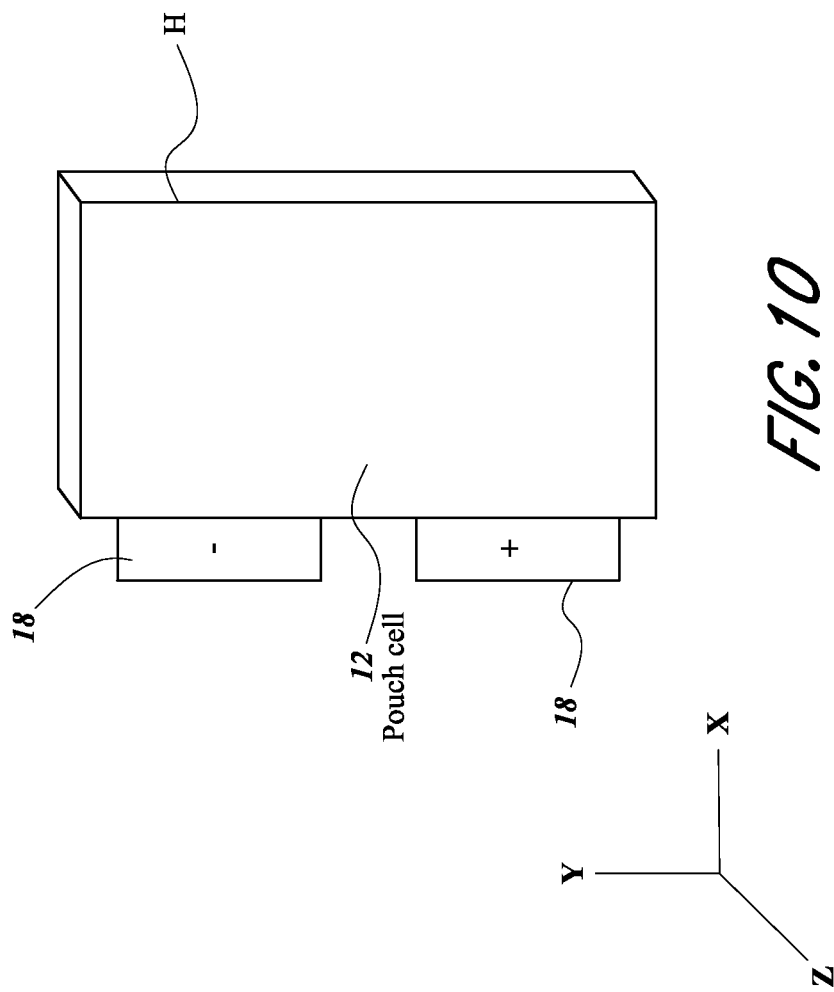
FIG. 10 illustrates an embodiment of a battery cell.
Figure 11:
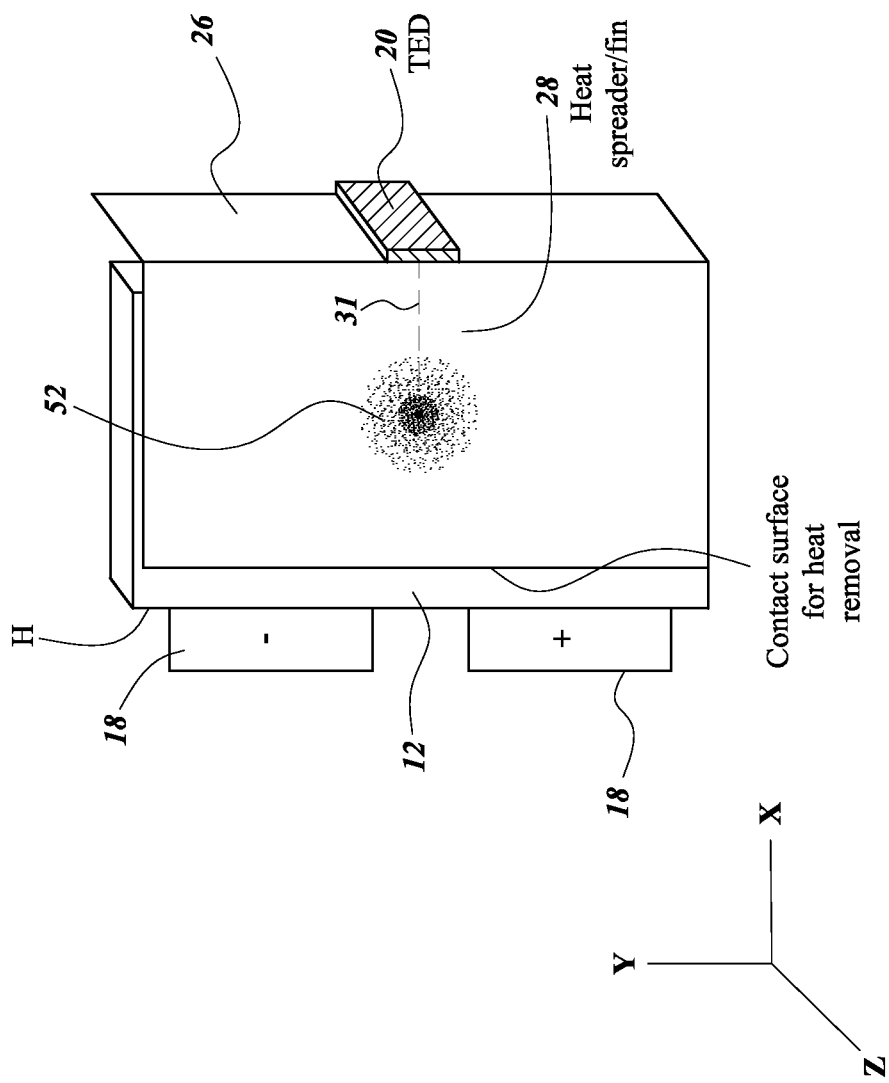
FIG. 11 illustrates an embodiment of a battery cell with a heat spreader positioned over a hotspot.

In some embodiments, as illustrated in FIGS. 10-11, the electrodes 18 are positioned along the height H of cell 12 extending parallel to the Y-axis. As illustrated in FIG. 11, the hotspot or localized heat generation 52 is positioned between the electrodes 18 further downwardly along the height H of the cell 12 relative to the hotspot 40 of the embodiment of FIG. 4. In order to minimize the thermal path or line along the thermal path 31 (e.g., shortest thermal path) from the hotspot or localized heat generation 52 to the cell 12, the position of the TED 20 is adjusted to be located on the fin 26 further downwardly along the Y-axis or height H of the cell 12.

In some embodiments, a battery thermal management system includes a battery pack having multiple cells electrically connected with one another to provide a single functional battery pack. In some embodiments, individual cells of the battery can be electrically connected together in series and/or parallel via electrically conductive bars or other connectors. The cells of a battery pack can be stacked in a tight engagement. For example, sides of the cells in the X-Y plane as illustrated in FIGS. 1B to 5 and 8-11 can stacked to face each other. Accordingly, such an arrangement provides for a sandwiched configuration of the cells along thickness T (e.g., shortest dimension of the cells 12 relative to the other sides of the cell 12 such as height H and width W). The battery pack can include a casing or other support structures (e.g., battery case 16) to form a tight engagement between the sides of the cells in the X-Y plane. In some embodiments, other sides of cells 12 (e.g., the relatively longer dimension side (W) or longest dimension side (H)) may be stacked depending on, for example, the position of the electrodes 18. Accordingly in some embodiments, the BTMS 10 may include a TED 20 placed directly over the hotspot 40 in the X-Y side as discussed herein without the heat spreader 28 and/or the fin 26, which can provide the shortest possible thermal path to the hotspot 40 without interfering with stacking of the cells 12 or physically obstructing the electrodes 18. Stated differently, stacking configuration of the battery cells may be determined based on a desired location of the TED. Such that, when direct thermal communication with the a side of the battery and the TED is desired, the TED may be placed directly onto the side of the battery cell without a fin 26 and/or heat spreader 28.

In some embodiments, the battery thermal management system can include one or more thermoelectric devices integrated with or connected to (e.g., in substantial thermal communication with) one or more cells of the battery. The thermoelectric devices can have a copper substrate layered on a ceramic substrate or any other suitable configuration. In some embodiments, one end, side or portion of each thermoelectric device can be connected to or integrated (in substantial thermal communication) with at least two adjacent cells that are connected in series. In some embodiments, at least one cell is not in substantial thermal communication with or connected to at least one TE device. Another end, side or portion of each thermoelectric device can be connected, clipped, adhered, bonded, clamped, or otherwise attached to a waste heat removal system (e.g., heat transfer device). The heat transfer device can be, for example, a liquid tube heat exchanger. In some embodiments, one heat transfer device can be attached to each thermoelectric device or to all of the TE devices. In other embodiments, multiple heat transfer devices can be attached or in substantial thermal communication with each thermoelectric device.

In some example embodiments, a thermal or battery thermal management system that described herein can include one or more of the following features:

1. At least one battery cell in or configured to be in thermal communication with a thermoelectric device, wherein a thermal path from a hotspot of the battery cell to the thermoelectric device is minimized.
2. A battery cell comprising a pouch cell.
3. A battery cell comprising a prismatic cell.
4. A battery cell comprising a cylindrical cell.
5. At least one battery cell in or configured to be in thermal communication with two or more thermoelectric devices, wherein thermal paths from a hotspot of the battery cell to the thermoelectric devices are minimized.
6. At least two battery cells in or configured to be in thermal communication with one thermoelectric device, wherein a thermal path from a hotspot of the battery cells to the thermoelectric device is minimized.
7. A TED comprising a waste side configured to be cooled by air.
8. A TED comprising a waste side configured to be cooled conductively through or via the battery case.
9. A battery configured to be open to or in thermal communication with external or ambient air.
10. A battery configured to be scale relative to external or ambient air.
11. A heat spreader comprising a fin positioned along a side of the cell, and at least one TED attached to the fin.
12. A heat spreader comprising two fins positioned along opposing sides of the cell, and at least one TED attached to each fin.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

The following is claimed:

1. A thermoelectric battery thermal management system configured to manage battery cell temperature, the system comprising:
    a battery cell comprising an electrode configured to deliver electric power to or from the battery cell, the electrode connected to the battery cell on a first side of the battery cell, wherein the battery cell is capable of generating a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell;
    a heat spreader on a second side of the battery cell and in thermal communication with the hotspot, the heat spreader over the center of the hotspot on the second side of the battery cell; and
    a thermoelectric device comprising a main surface and a waste surface, the thermoelectric device configured to transfer thermal energy between the main surface and the waste surface of the thermoelectric device upon application of electric current to the thermoelectric device, wherein the main surface of the thermoelectric device is in thermal communication with the heat spreader to heat or cool the battery cell by adjusting a polarity of the electric current delivered to the thermoelectric device, wherein the thermoelectric device is proximate to a third side of the battery cell, and wherein a geometric center of the main surface of the thermoelectric device is substantially on a line along a shortest thermal path on the heat spreader from the center of the hotspot to the third side of the battery cell with the geometric center of the main surface of the thermoelectric device projected onto a plane of the heat spreader extending along the second side of the battery cell.

2. The thermoelectric battery thermal management system of claim 1, wherein the second side is substantially perpendicular to a shortest dimension of the battery cell.

3. The thermoelectric battery thermal management system of claim 1, wherein the battery cell has a prismatic shape, and wherein when the prismatic shape is positioned in an X-Y-Z coordinate system, the first side is along an X-Z plane of the X-Y-Z coordinate system, the second side is along an X-Y plane of the X-Y-Z coordinate system, and the third side is along an Y-Z plane of the X-Y-Z coordinate system.

4. The thermoelectric battery thermal management system of claim 1, further comprising a fin connected to the heat spreader and in thermal communication with the hotspot via the heat spreader, the fin proximate to the third side of the battery cell.

5. The thermoelectric battery thermal management system of claim 1, further comprising:
    an other thermoelectric device comprising a main surface and a waste surface, the other thermoelectric device configured to transfer thermal energy between the main surface and the waste surface of the other thermoelectric device upon application of electric current to the other thermoelectric device, wherein the main surface of the other thermoelectric device is in thermal communication with the heat spreader to heat or cool the battery cell by adjusting a polarity of the electric current delivered to the other thermoelectric device, wherein the other thermoelectric device is proximate to a fourth side of the battery cell opposite the third side of the battery cell, wherein a geometric center of the main surface of the other thermoelectric device is substantially on the line along the shortest thermal path on the heat spreader with the geometric center of the main surface of the other thermoelectric device projected onto the plane of the heat spreader extending along the second side of the battery cell.

6. The thermoelectric battery thermal management system of claim 1, wherein the battery cell comprises an other electrode connected to the battery cell on the first side of the battery cell.

7. The thermoelectric battery thermal management system of claim 1, wherein the thermoelectric device extends along the third side of the battery cell less than half of a length of the third side along the second side of the battery cell.

8. The thermoelectric battery thermal management system of claim 1, wherein the battery cell is sealed within an enclosure, and wherein the waste surface of the thermoelectric device is in thermal communication with a wall of the enclosure, the wall of enclosure capable of acting as a heat source or a heat sink for the system.

9. The thermoelectric battery of thermal management system of claim 1, further comprising an other battery cell, the other battery cell comprising an electrode configured to deliver electric power to or from the other battery cell, the electrode of the other battery cell connected to the other battery cell on a first side of the other battery cell, wherein the other battery cell is capable of generating an other hotspot corresponding to a temperature increase of the other battery cell when the other battery cell is operating via the electrode of the other battery cell delivering electric power to or from the other battery cell, the other hotspot having a center corresponding to a point or a region of the other battery cell having a highest temperature relative to other regions of the other battery cell, and wherein the battery cell and the other battery cell are stacked with the first side of the battery cell and the first side of the other battery cell positioned substantially in parallel along a same plane.

10. The thermoelectric battery thermal management system of claim 9, wherein the other battery cell is in thermal communication with the heat spreader to heat or cool the other battery cell by adjusting the polarity of the electric current delivered to the thermoelectric device.

11. The thermoelectric battery thermal management system of claim 9, further comprising:
- an other heat spreader on a second side of the other battery cell and in thermal communication with the other hotspot, the other heat spreader over the center of the other hotspot on the second side of the other battery cell; and
- an other thermoelectric device comprising a main surface and a waste surface, the other thermoelectric device configured to transfer thermal energy between the main surface and the waste surface of the other thermoelectric device upon application of electric current to the other thermoelectric device, wherein the main surface of the other thermoelectric device is in thermal communication with the other heat spreader to heat or cool the other battery cell by adjusting a polarity of the electric current delivered to the other thermoelectric device, wherein the other thermoelectric device is proximate to a third side of the other battery cell, and wherein a geometric center of the main surface of the other thermoelectric device is substantially on a line along an other shortest thermal path on the other heat spreader from the center of the other hotspot to the third side of the other battery cell with the geometric center of the main surface of the other thermoelectric device projected onto a plane of the other heat spreader extending along the second side of the other battery cell.

12. The thermoelectric battery thermal management system of claim 1, further comprising a strip extending along the shortest thermal path to the thermoelectric device, the strip shorter than the heat spreader in at least one dimension.

13. The thermoelectric battery thermal management system of claim 12, wherein the strip is connected to the heater spreader and comprising a material having a higher thermal conductivity than a material of the heat spreader.

14. The thermoelectric battery thermal management system of claim 1, wherein the center of the hotspot is proximate to the first side of the battery cell relative to a fifth side of the battery cell opposite the first side of the battery cell.

15. The thermoelectric battery thermal management system of claim 14, wherein an entirety of the thermoelectric device is on a same side of a plane extending substantially equidistantly between the first side and the fifth side of the battery cell.

16. A thermoelectric battery thermal management system configured to manage battery cell temperature, the system comprising:
- a first battery cell comprising a first electrode configured to deliver electric power to or from the first battery cell, the first electrode of the first battery cell connected to the first battery cell on a first side of the first battery cell, wherein the first battery cell is capable of generating a first hotspot corresponding to a temperature increase of the first battery cell when the first battery cell is operating via the first electrode of the first battery cell delivering electric power to or from the first battery cell, the first hotspot having a center corresponding to a point or a region of the first battery cell having a highest temperature relative to other regions of the first battery cell;
- a second battery cell comprising a first electrode configured to deliver electric power to or from the second battery cell, the first electrode of the second battery cell connected to the second battery cell on a first side of the second battery cell, wherein the second battery cell is capable of generating a second hotspot corresponding to a temperature increase of the second battery cell when the second battery cell is operating via the first electrode of the second battery cell delivering electric power to or from the second battery cell, the second hotspot having a center corresponding to a point or a region of the second battery cell having a highest temperature relative to other regions of the second battery cell;
- a first heat spreader on a second side of the first battery cell and in thermal communication with the first hotspot, the first heat spreader over the center of the first hotspot on the second side of the first battery cell;
- a second heat spreader on a second side of the second battery cell and in thermal communication with the second hotspot, the second heat spreader over the center of the second hotspot on the second side of the second battery cell, wherein the second sides of the first and second battery cells are substantially parallel to each other;
- a third heat spreader in thermal communication with the first and second heat spreaders; and
- a thermoelectric device comprising a main surface and a waste surface, the thermoelectric device configured to transfer thermal energy between the main surface and the waste surface of the thermoelectric device upon application of electric current to the thermoelectric device, wherein the main surface of the thermoelectric device is in thermal communication with the third heat spreader to heat or cool the first and second battery cells by adjusting a polarity of the electric current delivered to the thermoelectric device, wherein the thermoelectric device is proximate to a third side of the first battery cell, and wherein a geometric center of the main surface of the thermoelectric device is substantially on a line along a shortest thermal path on the first heat spreader from the center of the first hotspot to the third side of the first battery cell with the geometric center of the main surface of the thermoelectric device projected onto a plane of the first heat spreader extending along the second side of the first battery cell.

17. The thermoelectric battery thermal management system of claim 16, wherein the thermoelectric device is proximate to a third side of the second battery cell, and wherein the geometric center of the main surface of the thermoelectric device is substantially on a line along a shortest thermal path on the second heat spreader from the center of the second hotspot to the third side of the second battery cell with the geometric center of the main surface of the thermoelectric device projected onto a plane of the second heat spreader extending along the second side of the second battery cell.

18. The thermoelectric battery thermal management system of claim 16, wherein each battery cell comprises a second electrode connected to the respective battery cell on the first side of the respective battery cell.

19. The thermoelectric battery thermal management system of claim 16, wherein the thermoelectric device extends along the third side of at least one of the first or second battery cell less than half of a length of the third side along the second side of the at least one of the first or second battery cell.

20. The thermoelectric battery thermal management system of claim 16, further comprising:
- a first fin connected to the first heat spreader and in thermal communication with the first hotspot via the first heat spreader, the first fin proximate to the third side of the first battery cell; and a second fin connected to the second heat spreader and in thermal communication with the second hotspot via the second heat spreader, the second fin proximate to the third side of the second battery cell,
wherein the first and second fins are in thermal communication with the third heat spreader to at least in part provide thermal communication between the third heat spreader and the first and second heat spreaders.

21. The thermoelectric battery thermal management system of claim 20, wherein the first fin extends from the first heat spreader substantially in parallel with the third side of the first battery cell, and the second fin extends from the second heat spreader substantially in parallel with the third side of the second battery cell.

22. The thermoelectric battery thermal management system of claim 16, wherein the center of each hotspot is proximate to the first side of each battery cell relative to a fifth side of each battery cell opposite the first side of each battery cell.

23. The thermoelectric battery thermal management system of claim 22, wherein an entirety of the thermoelectric device is on a same side of a plane extending substantially equidistantly between the first side and the fifth side of each battery cell.

24. A thermoelectric battery thermal management system configured to manage battery cell temperature, the system comprising:
a battery cell comprising an electrode configured to deliver electric power to or from the battery cell, the electrode connected to the battery cell on a first surface of the battery cell, wherein the battery cell is capable of generating a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell;
a heat spreader positioned on a second surface of the battery cell and in thermal communication with the hotspot, the heat spreader positioned over the center of the hotspot on the second surface of the battery cell;
a fin connected to the heat spreader and in thermal communication with the hotspot via the heat spreader, the fin positioned to provide a shortest thermal path along the heat spreader from the center of the hotspot to the fin, the fin on a first side of a plane, the plane parallel or tangential to the first surface where the electrode connects to the battery cell, wherein the electrode is on a second side of the plane; and
a thermoelectric device comprising a main surface and a waste surface, the thermoelectric device configured to transfer thermal energy between the main surface and the waste surface of the thermoelectric device upon application of electric current to the thermoelectric device, wherein the main surface of the thermoelectric device is in thermal communication with the fin to heat or cool the battery cell by adjusting a polarity of the electric current delivered to the thermoelectric device, wherein the shortest thermal path on the heat spreader extends to a dimension of a perimeter of the main surface of the thermoelectric device when the dimension of the perimeter of the main surface of the thermoelectric device is projected onto a surface of the heat spreader where the fin connects to the heat spreader, wherein the battery cell has a cylindrical shape, and wherein the heat spreader circumscribes a perimeter of the battery cell about a central axis of the cylindrical shape, the central axis perpendicular to the plane.

25. A method of manufacturing a thermoelectric battery thermal management system configured to manage battery cell temperature, the method comprising:
connecting a heat spreader to a battery cell having an electrode configured to deliver electric power to or from the battery cell, the electrode connected to the battery cell on a first surface of the battery cell, wherein the battery cell is capable of generating a hotspot corresponding to a temperature increase of the battery cell when the battery cell is operating via the electrode delivering electric power to or from the battery cell, the hotspot having a center corresponding to a point or a region of the battery cell having a highest temperature relative to other regions of the battery cell, wherein the heat spreader is connected on a second surface of the battery cell to be in thermal communication with the hotspot, the heat spreader positioned over the center of the hotspot on the second surface of the battery cell;
connecting a fin to the heat spreader in thermal communication with the hotspot, the fin positioned to provide a shortest thermal path along the heat spreader from the center of the hotspot to the fin, the fin on a first side of a plane, the plane parallel or tangential to the first surface where the electrode connects to the battery cell, wherein the electrode is on a second side of the plane; and
connecting a thermoelectric device to the fin, the thermoelectric device comprising a main surface and a waste surface, the thermoelectric device configured to transfer thermal energy between the main surface and the waste surface of the thermoelectric device upon application of electric current to the thermoelectric device, wherein the main surface of the thermoelectric device is in thermal communication with the fin to heat or cool the battery cell by adjusting a polarity of the electric current delivered to the thermoelectric device, wherein a geometric center of the main surface of the thermoelectric device is positioned substantially along the shortest thermal path on the heat spreader when the geometric center of the main surface of the thermoelectric device is projected onto a surface of the heat spreader where the fin connects to the heat spreader.

26. The method of claim 25, further comprising:
connecting an other fin to the heat spreader in thermal communication with the hotspot, the other fin on the first side of the plane; and
connecting an other thermoelectric device to the other fin, the other thermoelectric device comprising a main surface and a waste surface, the other thermoelectric device configured to transfer thermal energy between the main surface and the waste surface of the other thermoelectric device upon application of electric current to the other thermoelectric device, wherein the main surface of the other thermoelectric device is in thermal communication with the other fin along a line extending from and parallel to the shortest thermal path along the heat spreader to heat or cool the battery cell by adjusting a polarity of the electric current delivered to the other thermoelectric device.

27. The method of claim 25, further comprising stacking an other battery cell with the battery cell, the other battery cell comprising an electrode configured to deliver electric power to or from the other battery cell, the electrode of other battery cell connected to the other battery cell on a first surface of the other battery cell, wherein the other battery cell is capable of generating an other hotspot corresponding to a temperature increase of the other battery cell when the other battery cell is operating via the electrode of the other battery cell delivering electric power to or from the other battery cell, the other hotspot having a center corresponding to a point or a region of the other battery cell having a highest temperature relative to other regions of the other battery cell, and wherein the battery cell and the other battery cell are stacked with the first surface the battery cell and the first surface of the other battery cell positioned substantially along a same plane.

28. The method of claim 27, further comprising:
connecting an other heat spreader to a second surface of the other battery cell and in thermal communication with the other hotspot, the other heat spreader positioned over the center of the other hotspot on the second surface of the other battery cell;
connecting an other fin to the other heat spreader in thermal communication with the other hotspot via the other heat spreader, the other fin positioned to provide a shortest thermal path along the other heat spreader from the center of the other hotspot to the other fin, the other fin on a first side of an other plane, the other plane parallel or tangential to the first surface where the electrode of the other battery cell connects to the other battery cell, wherein the electrode of the other battery cell is on a second side of the other plane; and
connecting an other thermoelectric device with the other fin, the other thermoelectric device comprising a main surface and a waste surface, the other thermoelectric device configured to transfer thermal energy between the main surface and the waste surface of the other thermoelectric device upon application of electric current to the other thermoelectric device, wherein the main surface of the other thermoelectric device is in thermal communication with the other fin along the shortest thermal path of the other heat spreader to heat or cool the battery cell by adjusting a polarity of the electric current delivered to the other thermoelectric device.

29. The method of claim 27, further comprising:
connecting an other heat spreader to a second surface of the other battery cell and in thermal communication with the other hotspot, the other heat spreader positioned over the center of the other hotspot on the second surface of the other battery cell;
connecting an other fin to the other heat spreader and in thermal communication with the other hotspot via the other heat spreader, the other fin positioned to provide a shortest thermal path along the other heat spreader from the center of the other hotspot to the other fin, the other fin on a first side of an other plane, the other plane parallel or tangential to the first surface where the electrode of the other battery cell connects to the other battery cell, wherein the electrode of the other battery cell is on a second side of the other plane;
connecting a heat plate in thermal communication with both the fin and the other fin; and
connecting the main surface of the thermoelectric device with the heat plate to heat or cool the hotspots of the battery cell and the other battery cell by adjusting the polarity of the electric current delivered to the thermoelectric device.

* * * * *

UNITED STATES PATENT AND TRADEMARK OFFICE
CERTIFICATE OF CORRECTION

PATENT NO. : 9,590,282 B2  
APPLICATION NO. : 14/437645  
DATED : March 7, 2017  
INVENTOR(S) : Dmitri Kossakovski et al.

Page 1 of 1

It is certified that error appears in the above-identified patent and that said Letters Patent is hereby corrected as shown below:

In the Specification

Column 5, Line 8, change "aside" to --a side--.

Column 5, Line 55, after "in" delete "the".

Column 14, Line 46, after "of" insert --a--.

Column 14, Line 55, after "to" insert --a--.

Column 18, Line 26, after "(e.g.," insert --the--.

Column 19, Line 62, change "heal" to --heat--.

Column 20, Line 16, change "TEDs, in" to --TEDs. In--.

Column 21, Line 16-17 (approx.), after "heat" delete "associated with the hotspot".

Column 23, Line 8, after "the" insert --heat--.

Column 29, Line 30, change "scale" to --sealed--.

Signed and Sealed this  
Thirteenth Day of September, 2022

Katherine Kelly Vidal  
*Director of the United States Patent and Trademark Office*